(12) United States Patent
Milanovich

(10) Patent No.: US 11,708,135 B2
(45) Date of Patent: Jul. 25, 2023

(54) WASTE MANAGEMENT SYSTEM

(71) Applicant: Philip John Milanovich, Butte, MT (US)

(72) Inventor: Philip John Milanovich, Butte, MT (US)

(*) Notice: Subject to any disclaimer, the term of this patent is extended or adjusted under 35 U.S.C. 154(b) by 0 days.

(21) Appl. No.: 17/741,424

(22) Filed: May 10, 2022

(65) Prior Publication Data

US 2022/0266961 A1 Aug. 25, 2022

Related U.S. Application Data

(63) Continuation-in-part of application No. 17/001,635, filed on Aug. 24, 2020, now Pat. No. 11,325,280,
(Continued)

(51) Int. Cl.
*B63B 35/32* (2006.01)
*B09B 3/35* (2022.01)
(Continued)

(52) U.S. Cl.
CPC ............ *B63B 35/32* (2013.01); *B02C 18/142* (2013.01); *B02C 18/143* (2013.01);
(Continued)

(58) Field of Classification Search
CPC ....... B63B 35/32; B02C 19/186; B02C 19/18; B02C 21/026; B02C 18/142;
(Continued)

(56) References Cited

U.S. PATENT DOCUMENTS 1,739,761 A 12/1929 Kleinfeldt
2,471,043 A 5/1949 Schecnk
(Continued)

FOREIGN PATENT DOCUMENTS

DE 2549752 5/1977
JP 7-68192 3/1995
(Continued)

OTHER PUBLICATIONS

PMEL 2014 "water pressure at ocean depths" http://www.pmel.noaa.gov/eoi/nemo 1998/education/pressure.html (Year: 2014).
(Continued)

*Primary Examiner* — Liam Royce
(74) *Attorney, Agent, or Firm* — Swift & Swift, Attorneys at Law, P.L.L.C.; Stephen Christopher Swift

(57) ABSTRACT

A waste management system for plastic or other material floating on the surface and in the subsurface of a body of water. A shredding device will reduce the size of the particles of waste. Ocean water is removed by a drying device. The dried waste material is frozen to a temperature at or below minus fifty degrees Fahrenheit, using liquid nitrogen or other suitable means. The frozen waste material is then pulverized and ground into a powder. The powder may then be sprayed into a gas-filled chamber and heated. Temperature, pressure and humidity are maintained within the chamber for more than one minute. Microwave or other radiation and catalysts may be used to enhance the process of extraction. The processed material is then removed from the chamber. Carbon may be recycled or used as fuel by the ship. Water may be used by the ship or returned to the ocean.

3 Claims, 30 Drawing Sheets

Related U.S. Application Data which is a continuation-in-part of application No. 15/993,324, filed on May 30, 2018, now abandoned.

(51) Int. Cl.

| | |
|---|---|
| *E02B 15/00* | (2006.01) |
| *B09B 3/40* | (2022.01) |
| *B02C 19/18* | (2006.01) |
| *B03C 1/30* | (2006.01) |
| *B29B 17/02* | (2006.01) |
| *B29B 17/04* | (2006.01) |
| *B02C 18/14* | (2006.01) |
| *B02C 21/02* | (2006.01) |
| *B02C 23/38* | (2006.01) |
| *B09B 101/75* | (2022.01) |
| *B29B 17/00* | (2006.01) |

(52) U.S. Cl.
CPC .......... *B02C 19/186* (2013.01); *B02C 21/026* (2013.01); *B02C 23/38* (2013.01); *B03C 1/30* (2013.01); *B09B 3/35* (2022.01); *B09B 3/40* (2022.01); *B29B 17/02* (2013.01); *B29B 17/0408* (2013.01); *E02B 15/00* (2013.01); *B02C 19/18* (2013.01); *B03C 2201/20* (2013.01); *B09B 2101/75* (2022.01); *B29B 2017/0094* (2013.01); *B29B 2017/0224* (2013.01); *B29B 2017/0272* (2013.01); *B29B 2017/044* (2013.01); *B29B 2017/0416* (2013.01)

(58) Field of Classification Search
CPC ......... B02C 18/143; B02C 23/38; B03C 1/30; B03C 2201/20; B09B 3/40; B09B 3/35; B09B 2101/75; B29B 17/02; B29B 17/0408; B29B 2017/0094; B29B 2017/0272; B29B 2017/0416; B29B 2017/044; B29B 2017/0224

See application file for complete search history.

(56) References Cited

U.S. PATENT DOCUMENTS

| | | | |
|---|---|---|---|
| 2,609,150 A | 9/1952 | Bludeau | |
| 2,879,005 A | 3/1959 | Jarvis | |
| 3,029,227 A | 4/1962 | Robb | |
| 3,319,895 A | 5/1967 | Williams | |
| 3,398,902 A * | 8/1968 | Khomeriki | B01F 33/451 241/1 |
| 3,578,252 A | 5/1971 | Brewer | |
| 3,637,080 A | 1/1972 | Markel | |
| 3,966,614 A | 6/1976 | Ayers | |
| 3,995,816 A | 12/1976 | Motek | |
| 4,025,990 A | 5/1977 | Lovette, Jr. | |
| 4,098,463 A | 7/1978 | Lowry | |
| 4,145,290 A | 3/1979 | Nagy et al. | |
| 4,219,291 A * | 8/1980 | Hoeh | B23P 15/28 76/115 |
| 4,409,034 A | 10/1983 | Williams | |
| 4,575,427 A | 3/1986 | de Arce et al. | |
| 4,726,530 A | 2/1988 | Miller et al. | |
| 4,813,614 A | 3/1989 | Moore et al. | |
| 5,047,156 A | 9/1991 | Sullivan | |
| 5,368,240 A | 11/1994 | Bonnet | |
| 5,385,307 A | 1/1995 | Azar | |
| 5,588,600 A | 12/1996 | Perfido et al. | |
| 5,735,471 A | 4/1998 | Muro | |
| 5,824,650 A | 10/1998 | Suka | |
| 5,842,650 A | 12/1998 | Hofmann | |
| 5,971,307 A | 10/1999 | Davenport | |
| 6,090,291 A | 7/2000 | Akai et al. | |
| 6,668,562 B1 | 12/2003 | Shatten et al. | |
| 7,425,315 B2 | 9/2008 | Kruesi | |
| 7,504,028 B1 | 3/2009 | Gurfinkel | |
| 8,888,671 B2 | 11/2014 | Paulsen | |
| 9,415,327 B2 | 8/2016 | Fargier et al. | |
| 2004/0231342 A1 | 11/2004 | Hong et al. | |
| 2004/0253166 A1 | 12/2004 | Kruesi | |
| 2005/0080520 A1 | 4/2005 | Kline et al. | |
| 2013/0245345 A1 | 9/2013 | Hutchon | |
| 2014/0223908 A1 | 8/2014 | Sweeney | |
| 2015/0251733 A1 | 9/2015 | Kang et al. | |
| 2017/0248307 A1 | 8/2017 | George | |
| 2018/0074496 A1 | 3/2018 | Gordon et al. | |

FOREIGN PATENT DOCUMENTS

| | | |
|---|---|---|
| JP | 11-104510 | 4/1999 |
| SU | 1458661 | 2/1989 |
| WO | 9407670 | 4/1994 |
| WO | 2011155667 | 12/2011 |
| WO | 2018014922 | 1/2018 |

OTHER PUBLICATIONS

Emch, Rita 2015 "Using drones to hunt for the oceans' plastic pollution" https://www.swissinfo.ch/eng/race-for-water-odyssey_using-drones-to-hunt-for-the-oceans-plastic-pollution/41379106 (Year: 2015).

Libreton 2017 "River plastic emissions to the world's oceans" Nature Communications | 8:15611 | DOI: 10.1038/ncomms 15611 | www.nature.com/naturecommunications (Year: 2017).

D.M. Brown & L. Cheng "New Net for Sampling the Ocean Surface" Marine Ecology—Progrss Series (May 31, 1981).

\* cited by examiner

WASTE MANAGEMENT SYSTEM

CROSS REFERENCE TO RELATED APPLICATION

This application is a Continuation-In-Part of Regular Utility patent application Ser. No. 17/001,635, filed on Aug. 24, 2020, which was a Continuation-In-Part of Regular Utility patent application Ser. No. 15/993,324, filed May 30, 2018, which are incorporated herein by reference. It is drawn to an apparatus for waste management, elected Invention III (by the Restriction dated Feb. 1, 2021), claims 15-26 in parent application Ser. No. 17/001,506, with new matter added.

BACKGROUND OF THE INVENTION

1. Field of the Invention

The present invention relates to apparatus and systems for waste management.

2. Description of the Prior Art

The accumulation of non-biodegradable waste on both land and sea is a major environmental problem that is rapidly getting worse. The accumulation of plastic in the world's oceans is a particularly serious problem. The "Pacific Garbage Patch", which is mainly plastic floating in an area of the Pacific Ocean, is now twice the size of the state of Texas.

U.S. Pat. No. 1,739,761, issued on Dec. 17, 1929, to Henry F. Kleinfeldt, discloses a method of freezing "gummy, pasty, or viscous material" using "dry ice", then grinding or pulverizing it. The instant invention is distinguishable, because the waste material can be cooled to a lower temperature using liquid nitrogen, and it can be used for waste on the ocean's surface.

U.S. Pat. No. 2,471,043, issued on May 24, 1949, to Edward L. Schecnk, discloses a process for the treatment of waste rubber. The instant invention is distinguishable, because it removes waste plastic from bodies of water using nets.

U.S. Pat. No. 2,609,150, issued on Sep. 2, 1952, to Robert E. Bludeau, discloses mechanical pulverization of refrigerated plastics, which are super-cooled using liquid nitrogen. The instant invention is distinguishable, because it has an assembly-line apparatus that may be used on an ocean's surface.

U.S. Pat. No. 2,879,005, issued on Mar. 24, 1959, to Edgar A. Jarvis, discloses a method of refining scrap plastic and an apparatus therefor. The instant invention is distinguishable, because only it discloses apparatus for: collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 3,029,227, issued on Apr. 10, 1962, to Lester A. Robb, discloses cross-linking and cross-linking agents. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 3,319,895, issued on May 16, 1967, to Frank R. Williams and Erivan Hagopian, discloses elastomer grinding. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 3,578,252, issued on May 11, 1971, to John C. Brewer, discloses an industrial shredding apparatus. The instant invention is distinguishable, because it discloses apparatus for removes plastic from bodies of water using nets.

U.S. Pat. No. 3,637,080, issued on Jan. 25, 1972, to Arthur L. Markel, discloses methods and apparatus for skimming flotsam from the surface of a body of water. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 3,966,614, issued on Jun. 29, 1976, to Ray R. Ayers, discloses an Oil Spill Cleanup System. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 3,995,816, issued on Dec. 7, 1976, to Herbert Motek, discloses fragmentation of automobile tires by freezing them using liquefied gas, then dropping them into an impact mill. The instant invention is distinguishable, because it has apparatus for an assembly-line process that may be used on an ocean's surface.

U.S. Pat. No. 4,025,990, issued on May 31, 1977, to Norris G. Lovette, Jr., discloses a process in which scrap tires are cooled in a cryogenic freezer, comminuted and passed through a series of screening and density classification operations, followed by magnetic material separation and further cryogenic size reductions to produce a rubber crumb having a particle sized of about ½0 inch or less. The instant invention is distinguishable, because it has apparatus for an assembly-line process that may be used on an ocean's surface.

U.S. Pat. No. 4,098,463, issued on Jul. 4, 1978, to George W. Lowry, discloses a temperature-controlled comminuting method and apparatus. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 4,145,290, issued on Mar. 20, 1979, to Charles E. Nagy and John F. Nagy, discloses a skimmer for oil spills. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 4,409,034, issued on Oct. 11, 1983, to Roger F. Williams, discloses cleaning material from the surfaces of a structure by directly or indirectly using a cryogenic or refrigerant liquid. The instant invention is distinguishable, because it has apparatus that cleans waste from the world's water surfaces and subsurfaces.

U.S. Pat. No. 4,575,427, issued on Mar. 11, 1986, to Ysern de Acre and Giovvani Crosti Soldattti, discloses the conversion of resinous paint sludge from commercial spray-gun operations into a granulate material using cryogenic freezing and crushing. The instant invention is distinguishable, because it is not limited to apparatus for treating only one source of waste material.

U.S. Pat. No. 4,726,530, issued on Feb. 23, 1988, to David Miller and Daniel J. Priscu, discloses a method of resource recovery from used tires. The instant invention is distinguishable, because it uses nets to recover plastic from bodies of water.

U.S. Pat. No. 4,813,614, issued on Mar. 21, 1989, to David R. Moore and Curry L Aten, discloses treating waste products, such as vehicle tires, to recover their components, by cooling them to the temperature of crystallization of their components, as by spraying them with liquid nitrogen, then crushing them and separating the components. The instant invention is distinguishable, because it has apparatus that cleans waste from the world's water and land surfaces.

U.S. Pat. No. 5,047,156, issued on Sep. 10, 1991, to John L. Sullivan, discloses an oil recovery vessel and a method of utilizing an adjustable weir. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 5,368,240, issued on Nov. 29, 1994, to Oliver Bonnet, discloses an apparatus for reducing scrap rubber to particles, including an inclined pre-cooling tunnel with a conveyor, and a main cooling tunnel filled with a cooling medium (which may be liquid nitrogen) with a conveyor and a size reduction device. The instant invention is distinguishable, because it is not limited to treating only one source of waste material, and has apparatus for an assembly-line process that may be used on the ocean's and the land's surface.

U.S. Pat. No. 5,385,307, issued on Jan. 31, 1995, to Essa T. Azar, discloses a cryogenic tire recycling system, wherein the tires are cut up and frozen using liquid nitrogen, fractured using robot arms, and their components are then separated. The instant invention is distinguishable, because it is not limited to treating only one source of waste material, and has apparatus for an assembly-line process that may be used on the ocean's and the land's surface.

U.S. Pat. No. 5,588,600, issued on Dec. 31, 1996, to Kenneth F. Perfido and Anthony M. Cialone, discloses a process for recovering crumb rubber from used vehicle tires, including three comminuting operations, the second and third of which begin with contact with a liquid cryogenic (such as nitrogen). The instant invention is distinguishable, because it is not limited to treating only one source of waste material, and has apparatus for an assembly-line process that may be used on the surface of both the land and the sea.

U.S. Pat. No. 5,735,471, issued on Apr. 7, 1998, to Louis Muro, discloses a cryogenic tire disintegration process, comprising the step of freezing elastomeric into a brittle glass-like state, and the step of gradual disintegration of the frozen segments. The instant invention is distinguishable, because it is not limited to treating only one source of waste material, and has apparatus for an assembly-line process that may be used on the surface of both the land and the sea.

U.S. Pat. No. 5,824,709, issued on Oct. 20, 1998, Motoshi Suka, discloses a method for recycling waste plastic material. The instant invention is distinguishable, because it has apparatus that separates the waste plastic material from bodies of water using nets.

U.S. Pat. No. 5,842,650, issued on Dec. 1, 1998, to Juergen Hofmann, discloses a method for breaking up elastic material combined with metallic elements, in which the composite material is placed into an insulated vat holding liquid nitrogen, and then is subjected to high-energy electric pulses. The instant invention is distinguishable, because it has apparatus for an assembly-line process that may be used on the surface of both the land and the sea.

U.S. Pat. No. 5,971,307, issued on Oct. 26, 1999, to Ricky W. Davenport, discloses an in-line rotary grinder. The instant invention is distinguishable, because in it the material to be ground is first cryogenically frozen.

U.S. Pat. No. 6,090,291, issued on Jul. 18, 2000, to Yoshie Akai et al., discloses a waste processing method and apparatus. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 6,668,562, issued on Dec. 30, 2003, to Robert A. Shatten, John Carrier and Johnny Dean Jackson, discloses a system that may be used to convert rubber in tires to rubber crumb, using both liquid natural gas and liquid nitrogen. The instant invention is distinguishable, because it has apparatus for an assembly-line process that may be used on the surface of both the land and the sea.

U.S. Pat. No. 7,425,315, issued on Sep. 16, 2008, to Paul R. Kruesi, discloses a method to recapture energy from organic waste. The instant invention is distinguishable, because in it the waste material is first cryogenically frozen, and then pulverized into small particles having a large total surface area on which reactions can take place.

U.S. Pat. No. 7,504,028, issued on Mar. 17, 2009, to Gurfinkel, discloses a Water-Contaminant Separation System. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Pat. No. 8,888,671, issued on Nov. 18, 2014, to John Eirik Paulsen, discloses a method for disposal of drilling waste, contaminated sediments and residual waste, and a disposal facility for the same, in which the waste is ground up, mixed with binder, and allowed to set like concreate on the bottom of the sea floor. The instant invention is distinguishable, because it seeks to recycle as much of the waste as possible.

U.S. Pat. No. 9,415,327, issued on Aug. 16, 2016, to Cyrille Fargier and Philippe Montrocher, discloses a device for collecting and separating aqueous and/or oily liquids and cryogenic liquid. The instant invention is distinguishable, because it is designed to remove solid wastes from the environment.

U.S. Patent Application Publication No. 2004/0231342, published on Nov. 25, 2004, to Soon-Jin Hong et al., discloses a method for freeze-crushing waste materials. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Patent Application Publication No. 2004/0253166, published on Dec. 16, 2004, to Paul R. Kruesi, discloses a method of recapturing energy from organic waste. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Patent Application Publication No. 2005/0080520, published on Apr. 14, 2005, to Robert Kline and Richard Clark Walker, discloses. The instant invention is distinguishable, because only it discloses apparatus for collecting waste material from the surface of a body of water, using nets that are sunk to a depth of not more than four meters, and are raised slowly to allow fish to escape, while capturing floating plastic; separating plastic from waste material with a vertical vacuum; and pulverizing waste material using interacting screws.

U.S. Patent Application Publication No. 2013/0245345, published on Sep. 19, 2013, to Bruce Hutchon, discloses an apparatus and method for extracting hydrocarbons by staged heating. The instant invention is distinguishable, because it uses nets to remove plastic from bodies of water.

U.S. Patent Application Publication No. 2014/0223908, published on Aug. 14, 2014, to John Gerard Sweeney, discloses a Waste Management System. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Patent Application Publication No. 2015/0251733, published on Sep. 10, 2015, to Hee Jin Kang et al., discloses a catamaran that collects and processes plastic from the ocean surface. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Patent Application Publication No. 2017/0248307, published on Aug. 31, 2017, to Emmit J. George, discloses a vortex combustion boiler. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

U.S. Patent Publication Application No. 2018/0074496, published on Mar. 15, 2018, to Michael S. Gordon, Meenal Pore and Komminist Weldemariam, discloses a Drone System for Collecting and Managing Waste. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

West German Patent No. DE 2549752, published on May 18, 1977, to Georg Lippe, discloses recovery of waste rubber from pneumatic tyres. The instant invention is distinguishable, because in it the waste material is first cryogenically frozen, and then pulverized into small particles having a large total surface area on which reactions can take place.

Soviet Patent No. 1458661, published on Feb. 15, 1989, to G. D. Gamulya, A. P. Nazrenko and V. G. Solyanko, discloses an apparatus for recycling used tires, in which the tires are sprayed with a cryogenic agent, rather than dipped in a vat. The instant invention is distinguishable, because it is not limited to treating only one source of waste material, and has apparatus for an assembly-line process that may be used on the surface of both the land and the sea.

PCT International Patent Application Publication No. WO 94/07670, published on Apr. 14, 1994, to Zuwala et al., discloses cryogenic processing of used tires, wherein old tires are cut into strips, cooled in liquid nitrogen to make the rubber brittle, and the frozen strips are fed through pinch rollers. The instant invention is distinguishable, because it is not limited to treating only one source of waste material.

Japanese Patent No. 7-68192, published Mar. 14, 1995, to Osorini Piero, Frederic Eimgartner and Edito Eimgartoner, discloses a supercentrifugal pulverizer and a method for pulverizing thermosensitive material at low temperatures. The instant invention is distinguishable, because it has apparatus for an assembly-line process that may be used on the surface of both the land and the sea.

Japanese Patent No. 11-104510, published Apr. 20, 1999, to T. Kondo et al., discloses a rotary freezing drum for cryogrinding of rubber in recycled tires. The instant invention is distinguishable, because it is not limited to treating only one source of waste material.

PCT International Patent Application Publication No. WO 2011/155667, published on Dec. 15, 2011, to Seek et al., discloses a device for manufacturing solid fuel using a mixture of ocean waste and combustible waste. The instant invention is distinguishable, because it has a means of scooping up waste from the surface of the sea, and using it as fuel for the ship.

PCT International Patent Application Publication No. WO 2018/014922, published on Jan. 25, 2018, to Lars Boysen, discloses a Pyrolysis System and Process. The instant invention is distinguishable, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws.

The following non-patent documents have been cited by the Examiner in the parent applications:

PMEL 2014 "water pressure at ocean depths" http://www.pmel.noaa.gov/eoi/nemo 1998/education/pressure.html (Year: 2014).

Emch, Rita 2015 "Using drones to hunt for the oceans' plastic pollution" https://www.swissinfo.ch/eng/race-for-water-odyssey_using-drones-to-hunt-for-the-oceans--plastic-pollution/41379106 (Year: 2015).

LIBRETON 2017 "River plastic emissions to the world's oceans" NATURE COMMUNICATIONS|8:15611|DOI: 10.1038/ncomms 15611 www.nature.com/naturecommunications (Year: 2017).

D. M. Brown & L. Cheng "New Net for Sampling the Ocean Surface" MARINE ECOLOGY—PROGRSS SERIES (May 31, 1981).

The instant invention is distinguishable from the above references, because only it discloses apparatus for collecting waste material from the surface of a body of water, using nets that are sunk to a depth of not more than five meters, and are raised slowly to allow fish to escape, while capturing floating plastic; separating plastic from waste material with a vertical vacuum; and pulverizing waste material using interacting screws or other means.

None of the above inventions and patents, taken either singly or in combination, is seen to describe the instant invention as claimed.

SUMMARY OF THE INVENTION

The present invention is a waste management system, primarily intended to be for waste material floating on an ocean's surface and subsurface, though it can also be used on land. When used to collect waste floating on the ocean's surface and subsurface, a ship (or another vessel) having a specially designed bow may be used. This invention is designed to treat macro-plastic and micro-plastic. Macro plastic floats on or near the surface of the water. Microplastics are concentrated in the top five meters of the water (i.e., the "subsurface"). The concentration of micro-plastics falls exponentially with depth, with 90% being in the top five meters of the water.

The waste may be forced by the ship's motion onto a conveyor belt, or a net, dragline, paddlewheel, vacuum pump, screw or other suitable means of movement may be used. A shredding device will reduce the size of the particles of waste. Ocean water is removed by a drying device. The dried waste material is frozen using liquid nitrogen or other suitable means, to a temperature at or below minus fifty degrees Fahrenheit. The frozen waste material is then pulverized and ground into a powder. Pulverizing maximizes the ratio of surface area to volume, and the ratio of surface area to mass. The powder may then be sprayed into a gas filled chamber and heated. Steam may be used to maintain humidity within the chamber. Pressure within the chamber may be maintained at 0.25 to 500 atmospheres. Temperature, pressure and humidity should be maintained within the chamber for more than one minute. Microwave or other radiation and catalysts, ceric sulfate, platinum group metals, coated or uncoated, may be used to enhance the process of extraction. The processed material is then removed from the chamber. Carbon and water may be recycled. The carbon may be used as fuel by the ship. Water may also be used by the ship or returned to the ocean in a non-toxic condition.

The invention includes collecting waste material from the surface and subsurface of a body of water, using one or more nets, with varying mesh size openings from top to bottom, with larger mesh sizes at the top, that are sunk to a depth of no more than five meters, and are raised slowly to allow fish to escape, while capturing floating plastic. A vertical vacuum may be used to separate plastic from heavier waste material. The waste material may be pulverized using interacting screws.

Accordingly, it is a principal object of the invention to provide apparatus for clearing the world's oceans, seas, lakes, rivers and streams of floating plastic.

It is another object of the invention to provide apparatus for clearing both land and sea of non-biodegradable waste generally.

It is a further object of the invention to recover carbon as fuel from waste materials.

Still another object of the invention is to recover purified water from waste materials.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a waste management system.

Figure 1:
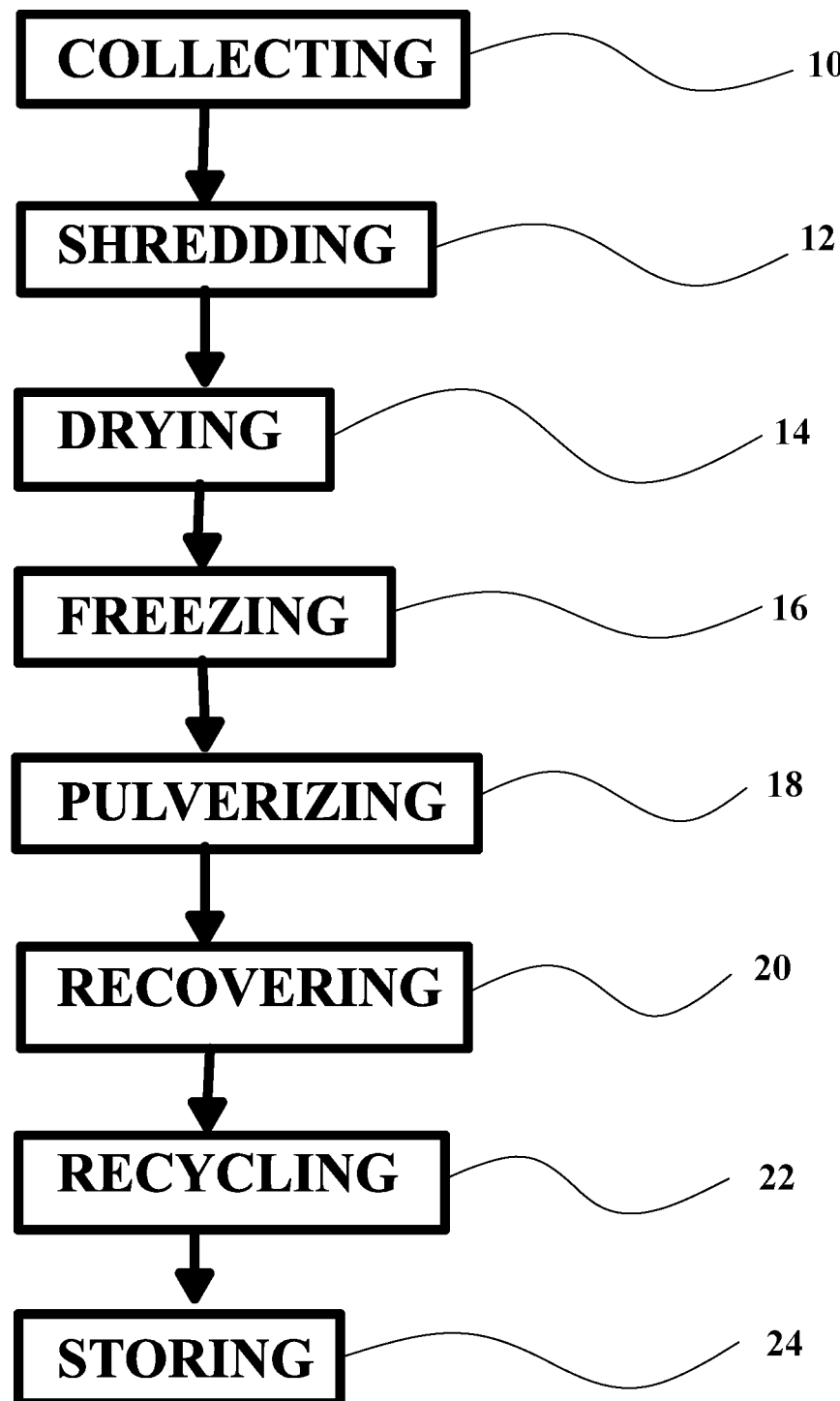
FIG. 1 is a flow chart of the preferred embodiment of the invention.

FIG. 1 is a flow chart of the preferred embodiment of the invention, showing a method of waste management, comprising the steps of:

collecting waste material 10;
shredding the waste material 12;
drying the waste material 14;
freezing the waste material 16 to a temperature at or below minus fifty degrees Fahrenheit;
pulverizing the waste material, to maximize the ratio of the surface area to volume, and maximize the ration of surface area to mass, of particles of the waste material 18;
recovering useful material from the waste material 20;
recycling the recovered useful material 22; and
storing the recovered useful material 24.

The waste material should be frozen to a temperature, preferably at or below minus fifty degrees Fahrenheit. Liquid nitrogen, a solution of dry ice and ethanol, or other suitable means of cryogenic freezing may be used. Material that is cryogenically frozen tends to crystallize and become brittle, and therefore easier to pulverize into small particles. (Cryogenic means very cold, e.g., below minus fifty degrees Fahrenheit.) The ratio of the surface area to volume (and mass) increases as particles become small, due to the square-cube law, which states: When an object undergoes a proportional increase (or decrease) in size, its new surface area is proportional to the square of the multiplier, and its new volume is proportional to the cube of the multiplier. (In the case of a decrease, the multiplier will be a fraction.) As smaller particles have a relatively larger surface area on which chemical reactions can take place, they may be more easily converted by chemical reactions into a useful form.

A gas is used in the recovery of the useful material that reacts with the waste material. The gas is preferably a carbon oxide gas, such as carbon monoxide or carbon dioxide. A catalyst such as ceric sulphate, or platinum group metals, coated or uncoated, may be used, in the presence of steam, at a pressure of one atmosphere for a time greater than ten minutes. The waste material may include plastic or any carbon containing material. The waste material may be collected from land or from water. It may be collected from the surface or the subsurface of a body of water, such as an ocean, sea, lake or river.

Figure 2:
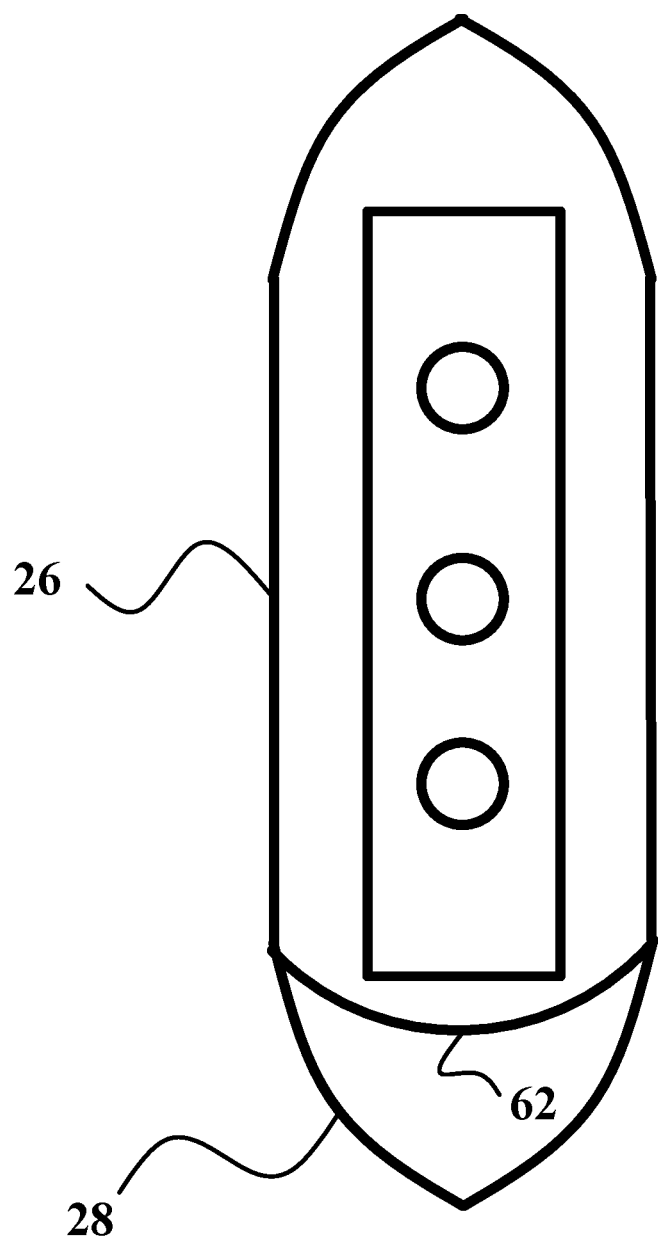
FIG. 2 is a top plan view of a vessel in the preferred embodiment of the invention, having its bow in a closed position.
Figure 3:
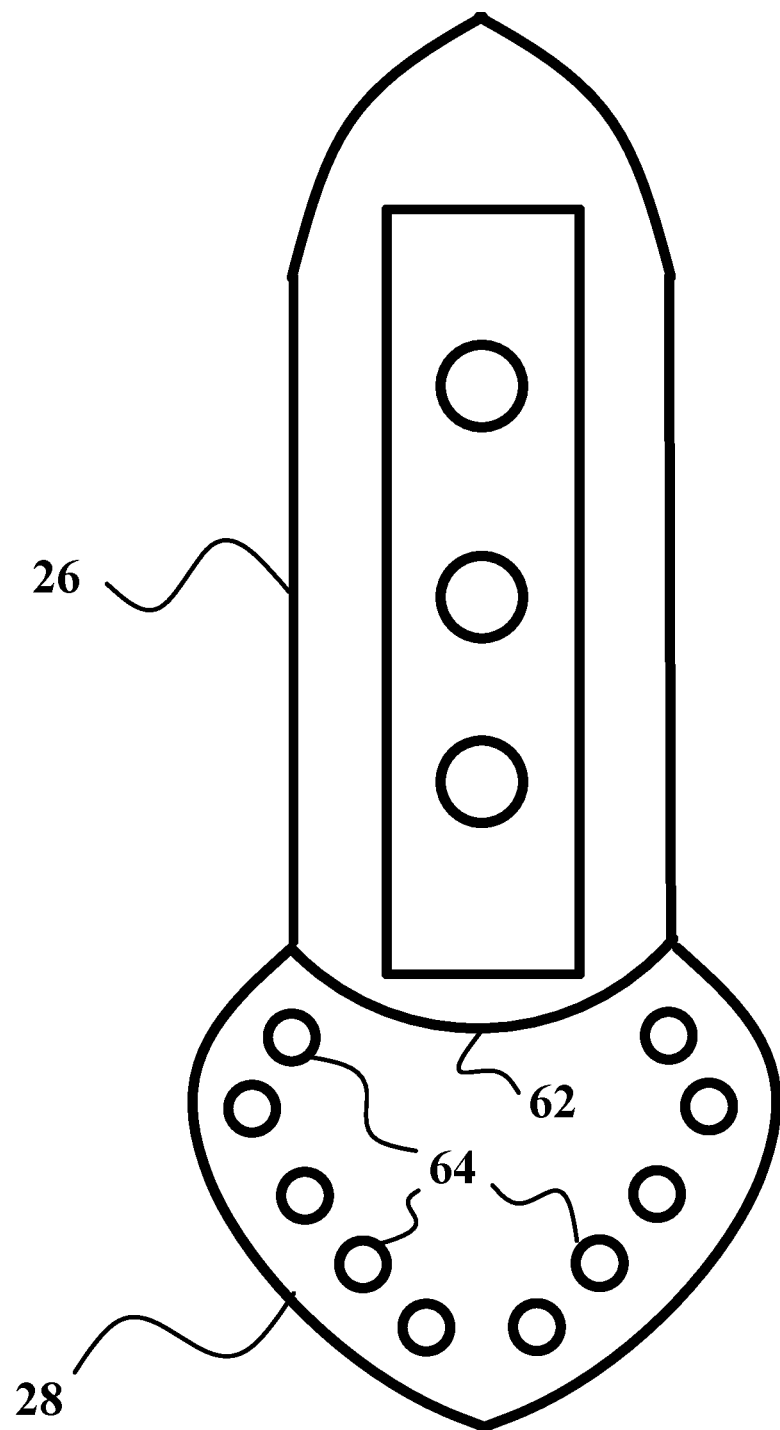
FIG. 3 is a top plan view of a vessel in the preferred embodiment of the invention, having its bow in an expanded open position.

The waste material may be collected using a ship, boat or other vessel. The vessel may have a bow that can open up to a greater width than the vessel's beam. FIG. 2 is a top plan view of the vessel 26 in the preferred embodiment of the invention, having its bow 28 in a closed position. FIG. 3 is a top plan view of the vessel 26 in the preferred embodiment of the invention, having its bow 28 in an expanded open position. The waste material may also be collected and moved into the vessel using the movement of the vessel, or the current flow in the body of water.

Figure 4:
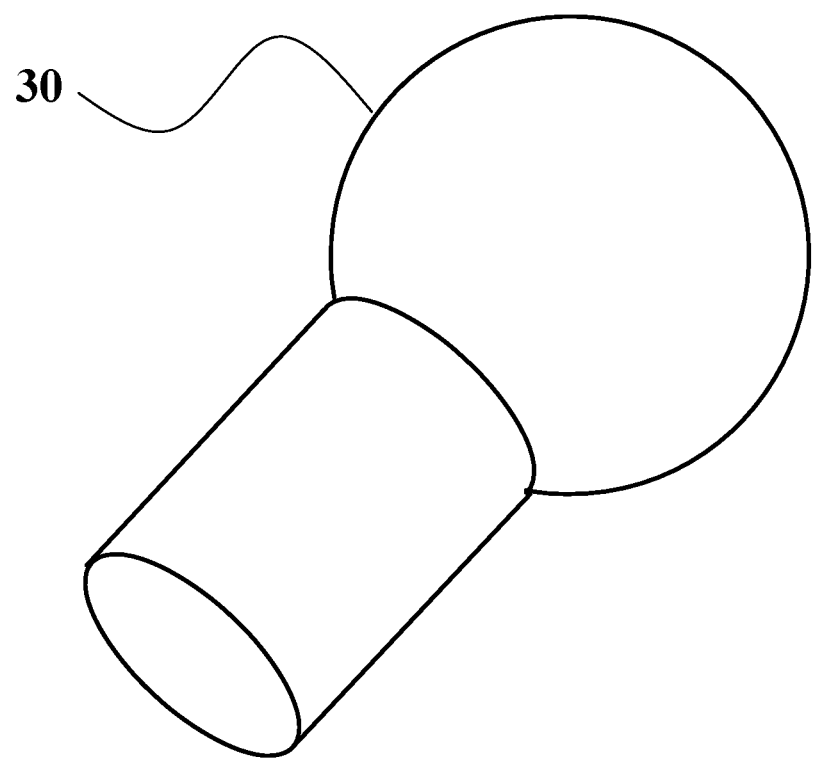
FIG. 4 is a perspective view of a pump in the preferred embodiment of the invention.
Figure 5:
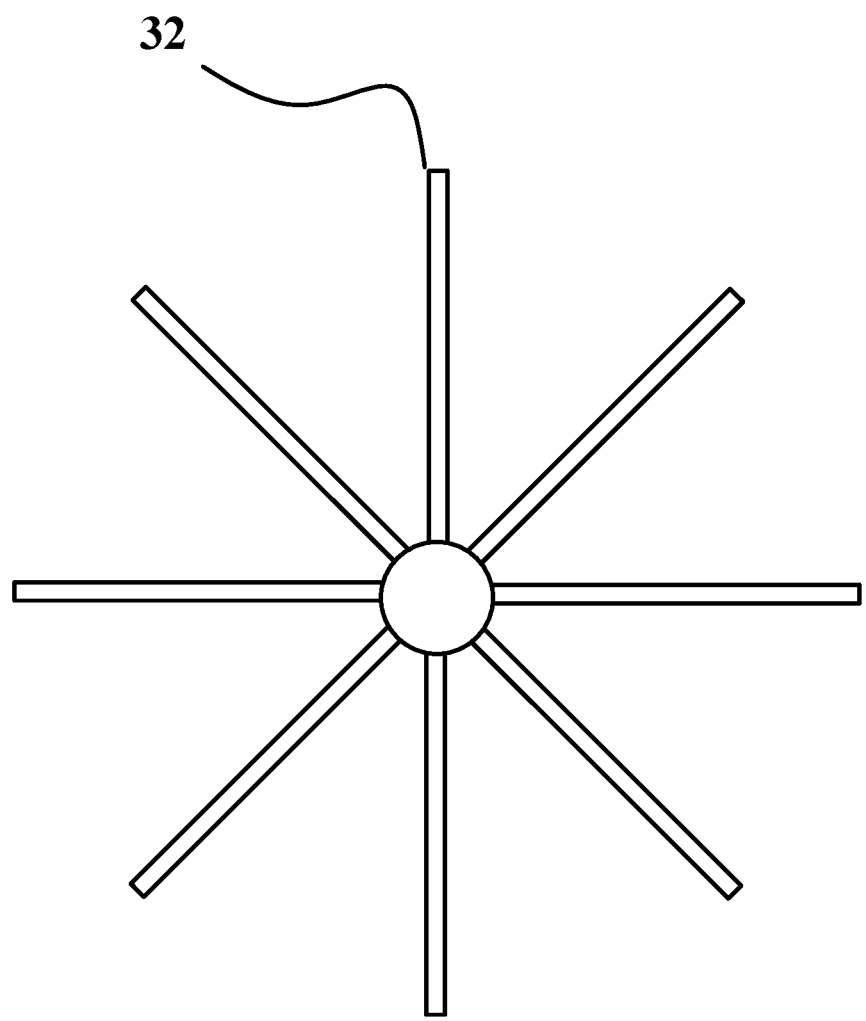
FIG. 5 is a side elevation view of a paddle in the preferred embodiment of the invention.
Figure 6:
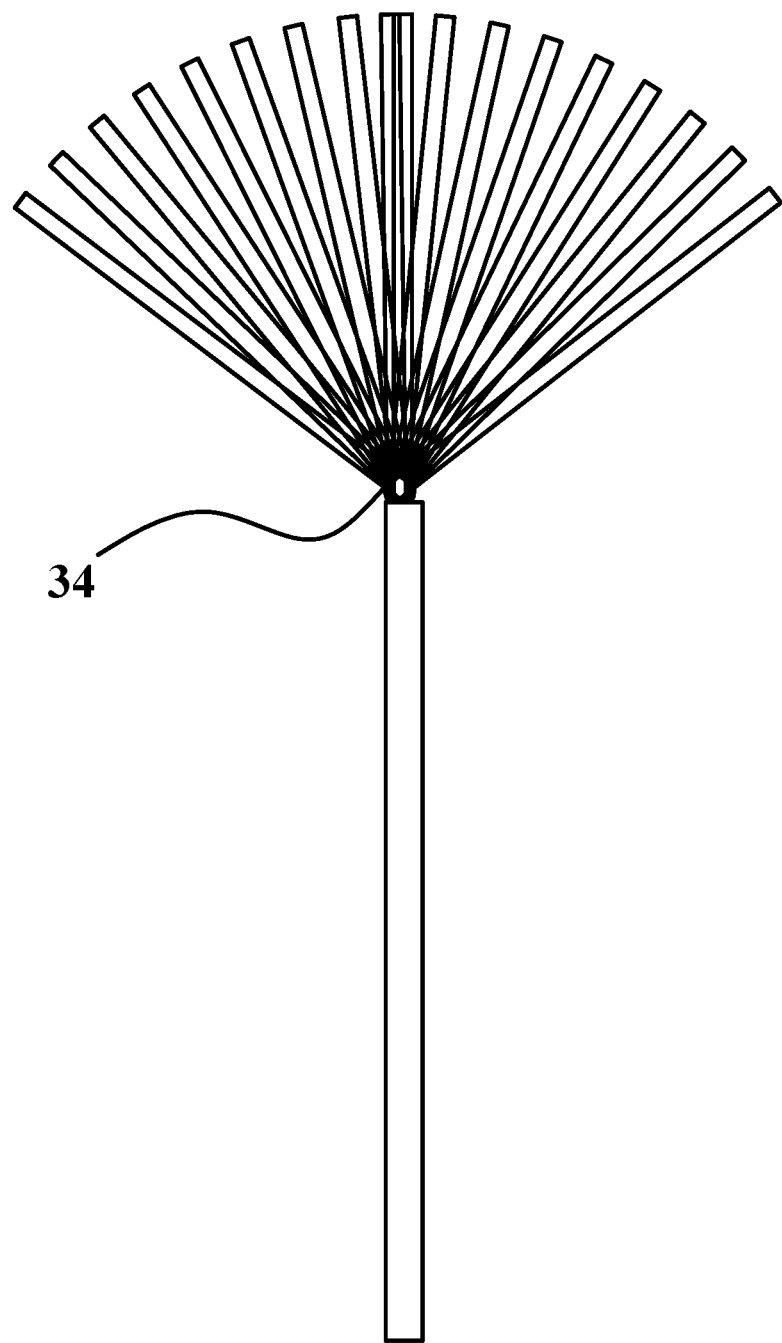
FIG. 6 is a front elevation view of a rake in the preferred embodiment of the invention.
Figure 7:
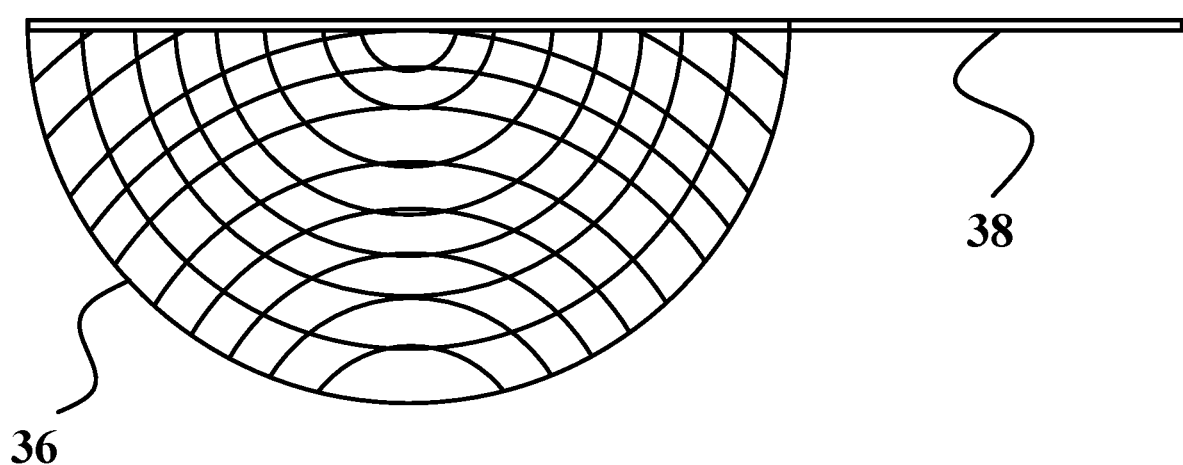
FIG. 7 is a right-side elevation view of a net or dragline in the preferred embodiment of the invention.
Figure 8:
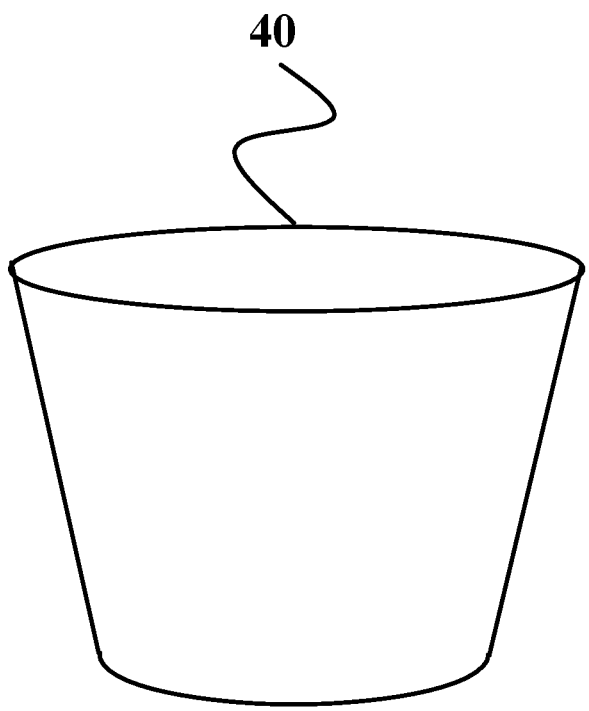
FIG. 8 is a perspective view of a bucket in the preferred embodiment of the invention.
Figure 9:
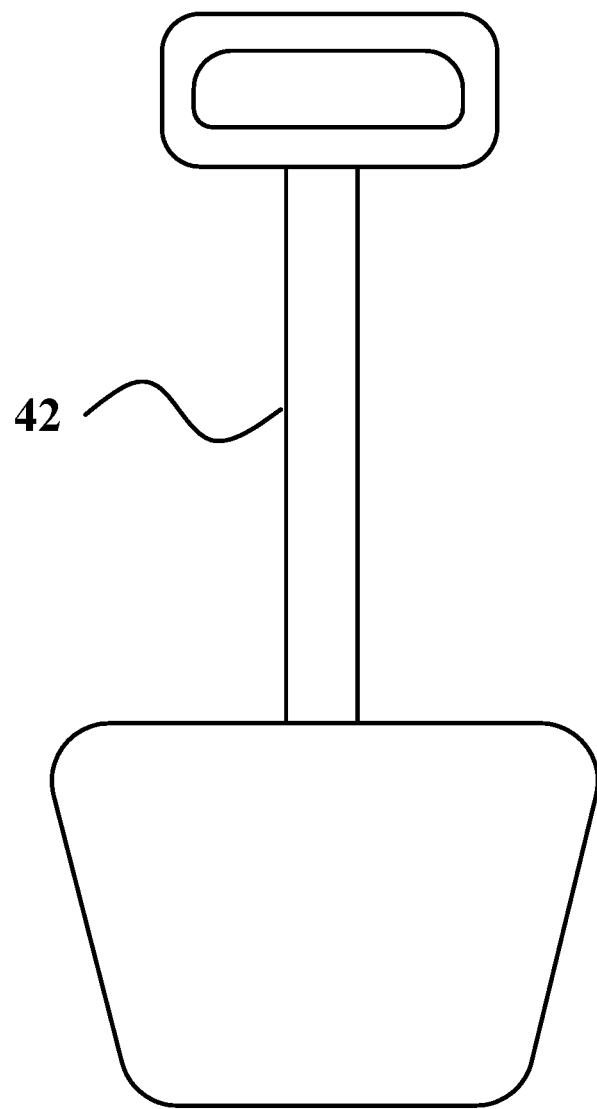
FIG. 9 is a front elevation view of a shovel in the preferred embodiment of the invention.
Figure 10:
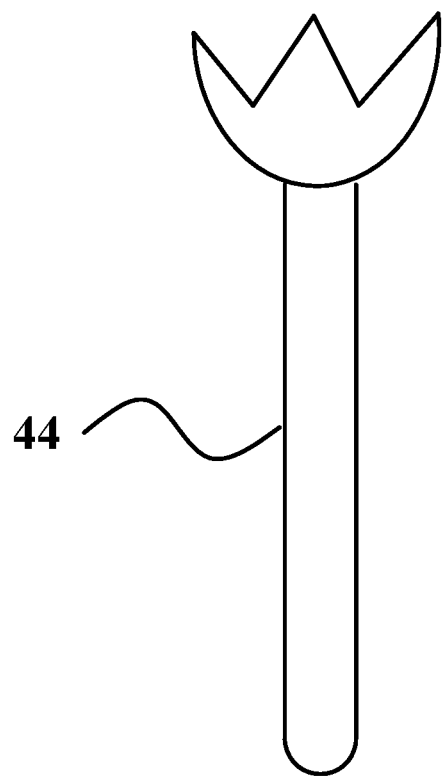
FIG. 10 is a front elevation view of a fork in the preferred embodiment of the invention.
Figure 11:
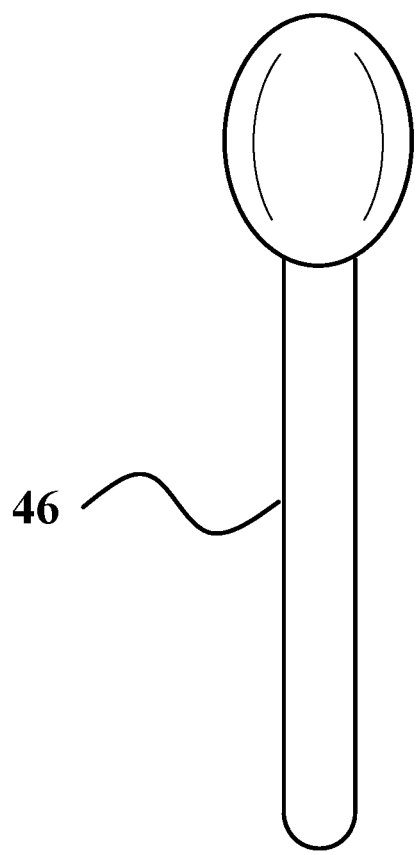
FIG. 11 is a front elevation view of a spoon in the preferred embodiment of the invention.

The waste material may be collected using pumps 30 in FIG. 4, paddles or paddlewheels 32 in FIG. 5, rakes 34 in FIG. 6, nets 36 or draglines 38 in FIG. 7, buckets 40 in FIG. 8, shovels 42 in FIG. 9, forks 44 in FIG. 10, spoons 46 in FIG. 11, or any other suitable devices, and moved into the vessel or other suitable container.

Figure 12:
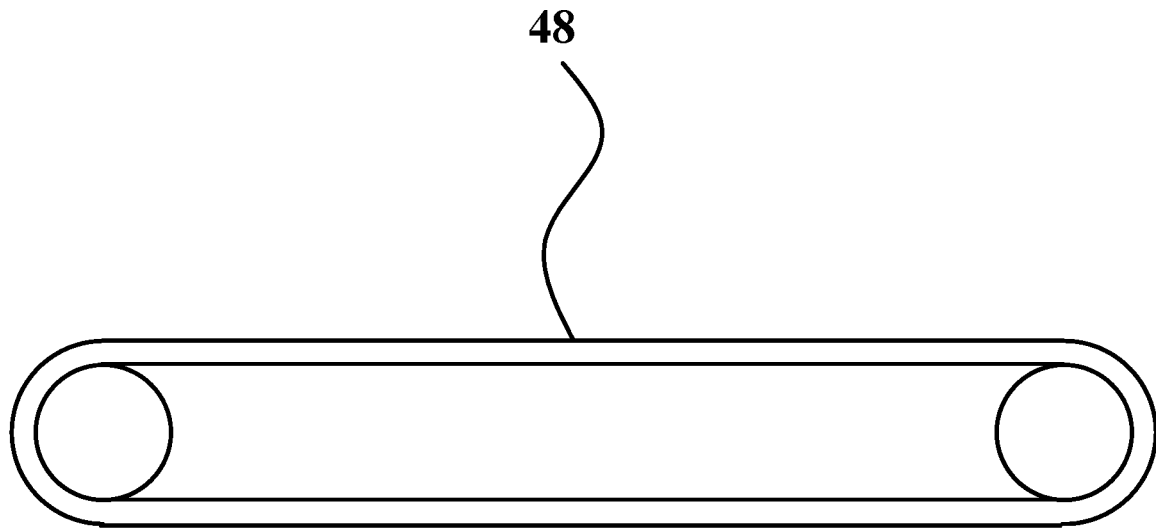
FIG. 12 is a side elevation view of a conveyor belt in the preferred embodiment of the invention.

FIG. 12 is a side elevation view of a conveyor belt 48 in the preferred embodiment of the invention, which is used to collect waste material from the water or land, into a vessel or other suitable container. The conveyer belt is capable of movements including extension, retraction, raising, lowering, and titling at an angle, to help collect and move the waste material.

Figure 13:
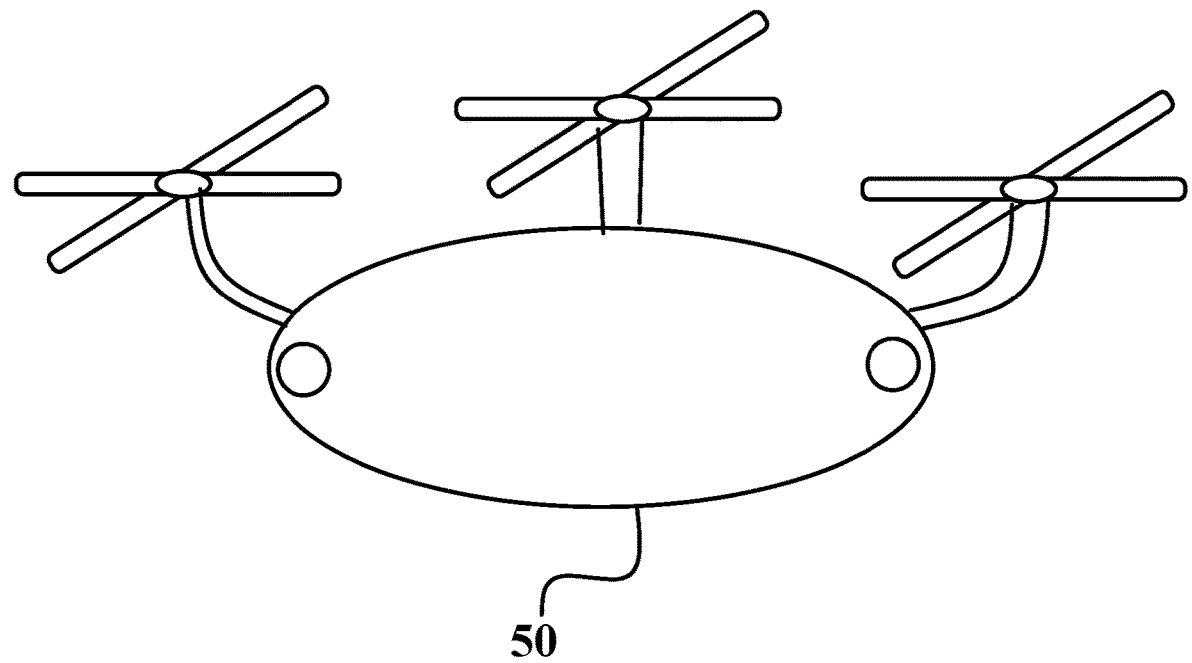
FIG. 13 is a perspective view of a drone in the preferred embodiment of the invention.

FIG. 13 is a perspective view of a drone 50 in the preferred embodiment of the invention, which can be used to monitor the waste material.

Figure 14:
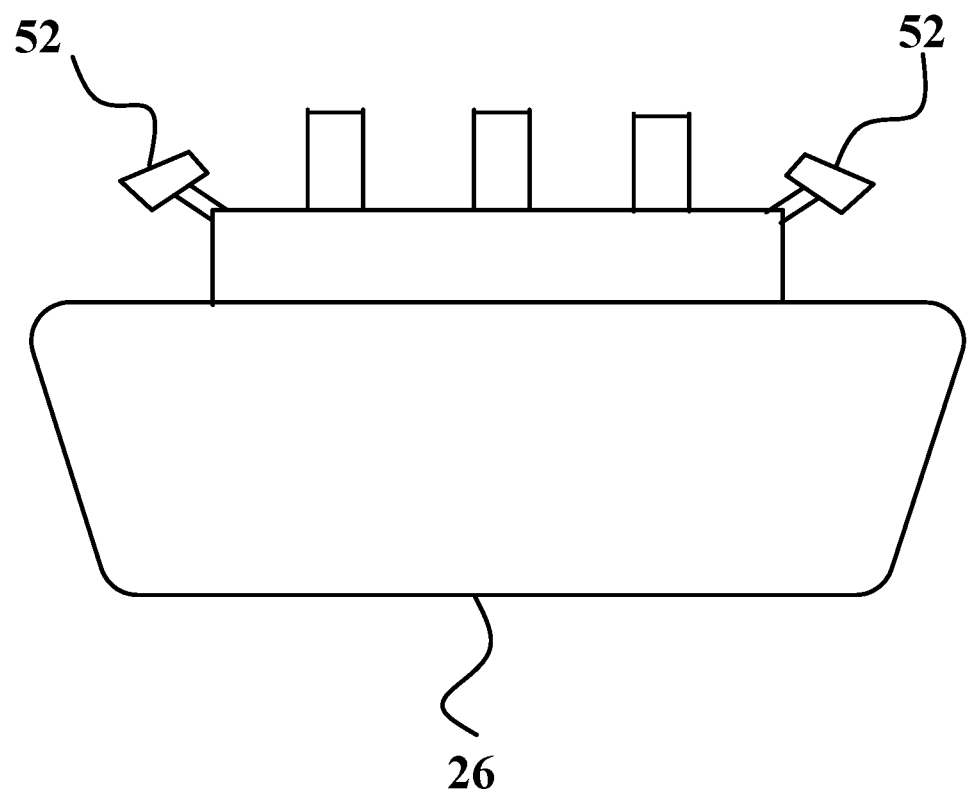
FIG. 14 is a side elevation view of a vessel with cameras in the preferred embodiment of the invention.

FIG. 14 is a side elevation view of a vessel with cameras 52 in the preferred embodiment of the invention. The cameras can be used to monitor the waste material.

Figure 15:
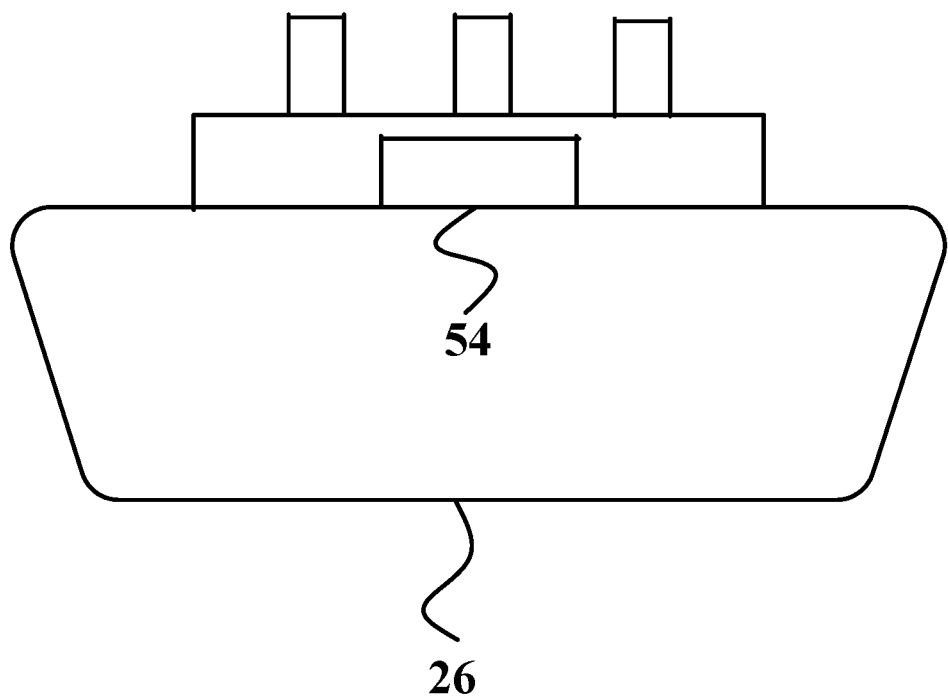
FIG. 15 is a side elevation view of a vessel with a laboratory in the preferred embodiment of the invention.

FIG. 15 is a side elevation view of a vessel with a laboratory 54 in the preferred embodiment of the invention. The laboratory is used to analyze the waste material, to determine its type, chemical and physical makeup, identity, and origin.

Figure 16:
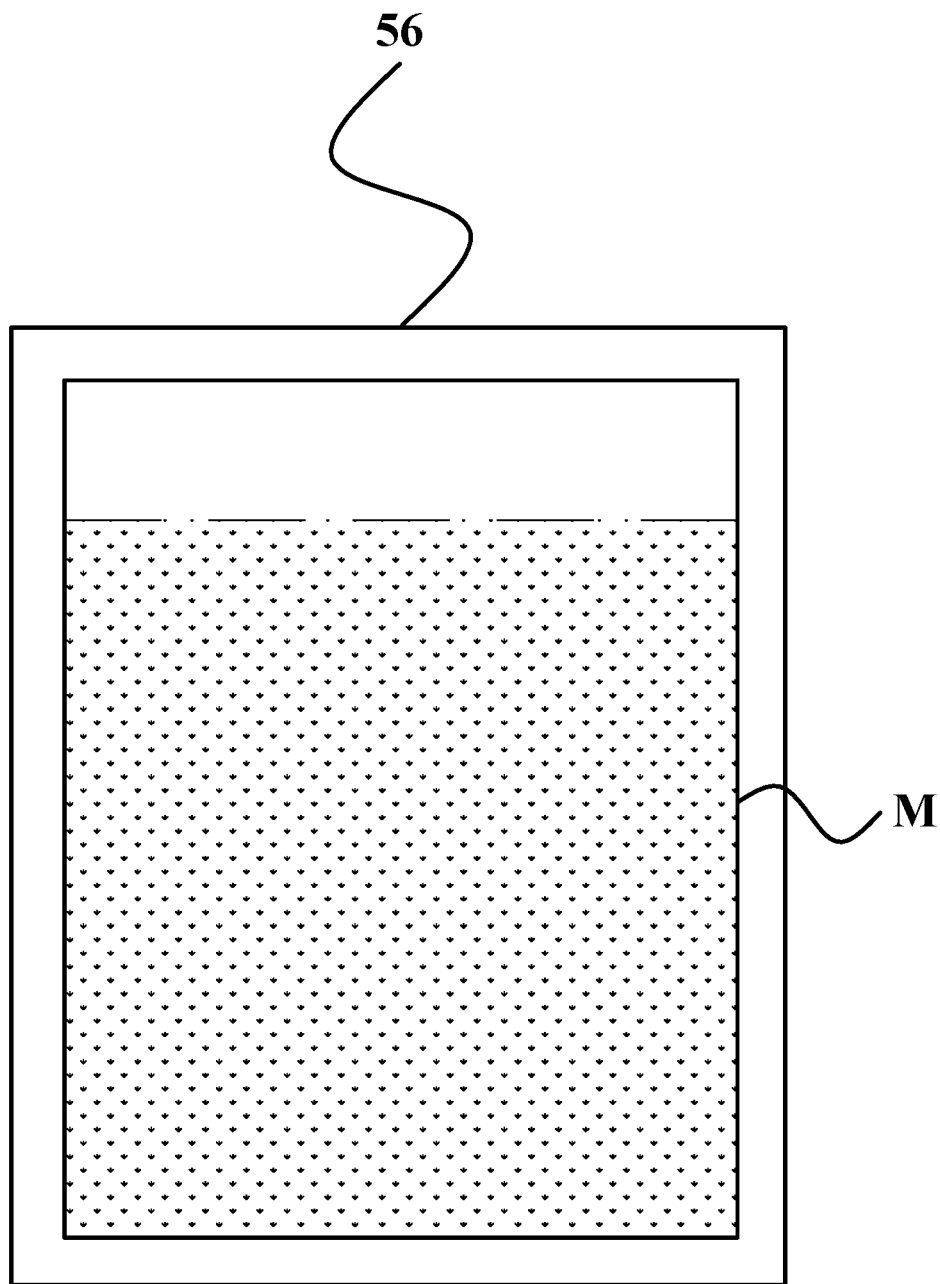
FIG. 16 is a front elevation view of a chamber in the preferred embodiment of the invention.

FIG. 16 is a front elevation view of a chamber 56 in the preferred embodiment of the invention, showing the waste material M being processed inside the chamber.

Figure 17:
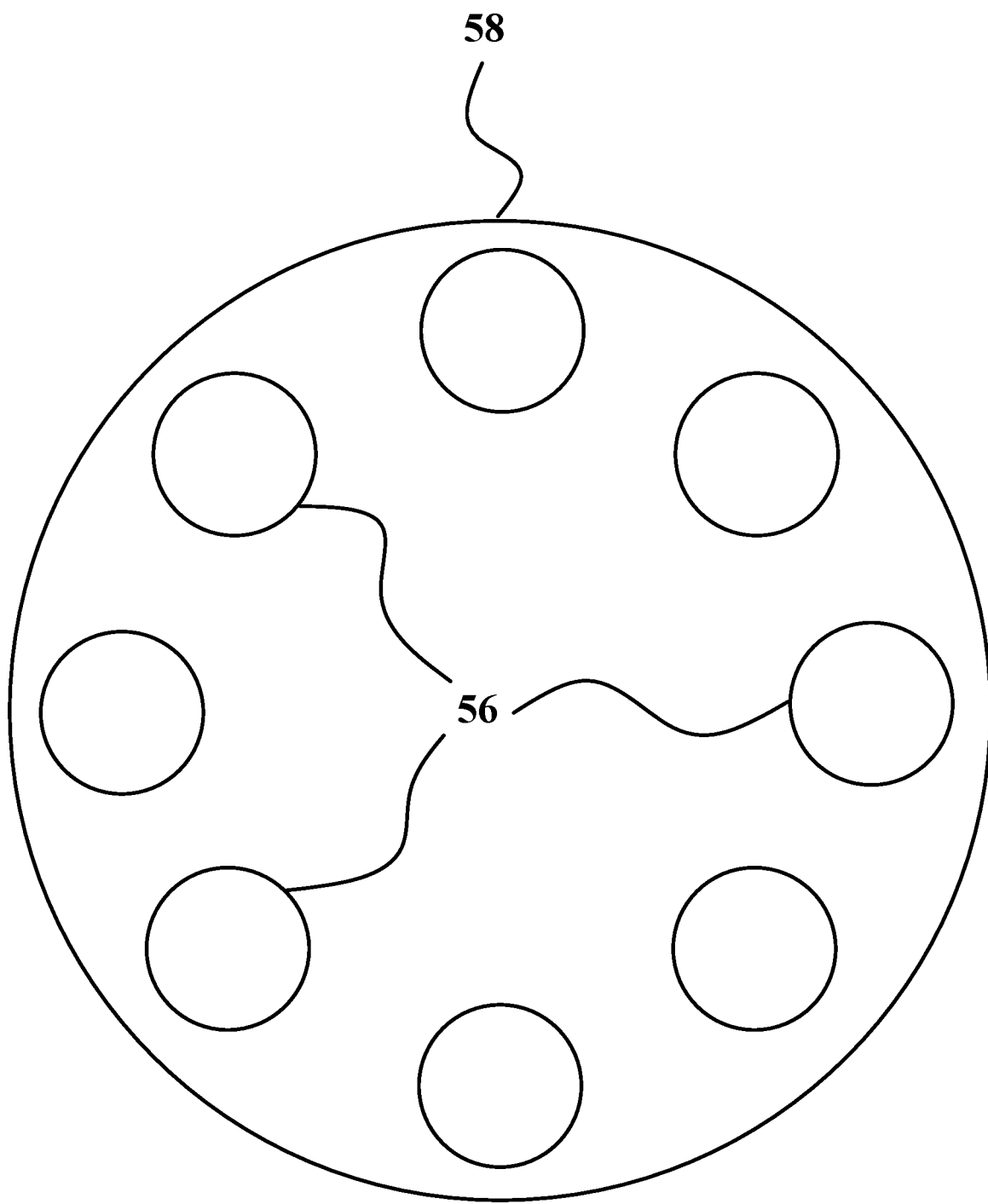
FIG. 17 is a top plan view of a plurality of the chambers on a rotating table in the preferred embodiment of the invention.

FIG. 17 is a top plan view of a plurality of the chambers 56 on a rotating table 58 in the preferred embodiment of the invention.

Figure 18:
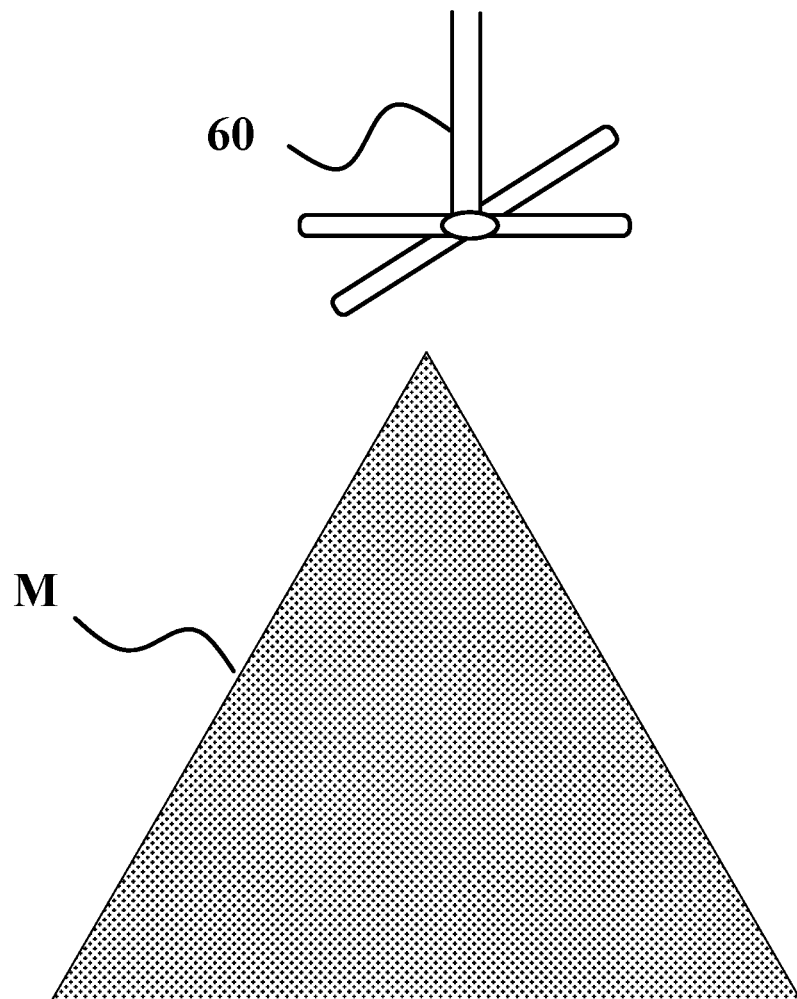
FIG. 18 is perspective view of a dryer removing moisture from waste material in the preferred embodiment of the invention.

FIG. 18 is perspective view of a dryer 60 removing moisture from waste material M in the preferred embodiment of the invention. Dryers may use fan blades, air, heated air, blowers, vibration, radiation, chemicals, gases, or any other suitable means.

Where metal may be present in the waste material, it should be removed before the waste material is shredded or further processed. First, the waste material is passed under a series of magnets, preferably electromagnets. The magnets gather and release magnetic material (metal that can be magnetically attracted) into a size reducer. The size reducer includes grinders and/or shredders. The magnetic material is reduced in size, preferably to an average diameter of one centimeter or less. It is then stored and recycled.

Particles of the waste material are shredded to a size of no more than one meter at their longest dimension. Pulverization then reduces the average diameter of particles of the waste material to one centimeter or less, preferably one millimeter or less, most preferably one-tenth of a millimeter or less. After it is pulverized, the waste material is placed in a chamber at a temperature greater than thirty-two degrees Fahrenheit, preferably between 212 and 3,000 degrees Fahrenheit.

The pressure in the chamber is between 0.25 and 500 times the average pressure of air at sea level. The humidity in the chamber is kept greater than one percent but less than one hundred percent. Radiation and/or catalysts are used in the chamber to enhance the process of discovery. Carbon and water are collected from the chamber and recycled. The carbon may be used as fuel by the vessel or elsewhere. The water is purified, and may be used for drinking, washing, irrigating crops, industrial processes, etc. Where toxic substances are present in the waste material, after it has been processed the first time, it is processed again one or more times, to remove the toxic substances. Chemicals that neutralize or remove the toxic substances may be added to the waste material. After the waste material in a chamber has been completely processed, the chamber is purged (by washing, vacuuming, sweeping, air pressure, agitation, or other suitable means) of all remnants of the waste material, before more waste material is placed in the chamber.

Besides a method for waste management, the invention also includes apparatus for carrying out the method, including:

one or more chambers, within which waste material is:

frozen to a temperature at or below minus fifty degrees Fahrenheit;

pulverized to maximize the ratio of the surface area to volume (and mass) of particles of the waste material; and processed to recover useful material.

The waste material is frozen using freezers, which may be inside or outside of the chambers. The waste material is pulverized using pulverizers, which may be inside or outside of the chambers. The waste material is processed using processors, which may be inside or outside of the chambers. The freezing, pulverization, and processing of the waste material may take place in separate chambers or other spaces.

There can be a plurality of the chambers, that are rotated to enable continuous processing of the waste material. As shown in FIGS. 2 and 3, the apparatus can include a vessel 26 to collect the waste material, having a bow 28 that can open up to a greater width than the vessel's beam, to enable more waste material to be brought into the vessel. The vessel preferably has an inner bow 62 that prevents water from entering the vessel. As shown in FIG. 3, there are openings 64 in the vessel through which water can be removed from the waste material after it is brought into the vessel. Vessel or other waste collecting vehicles in the invention may be guided by a global positioning system.

Figure 19:
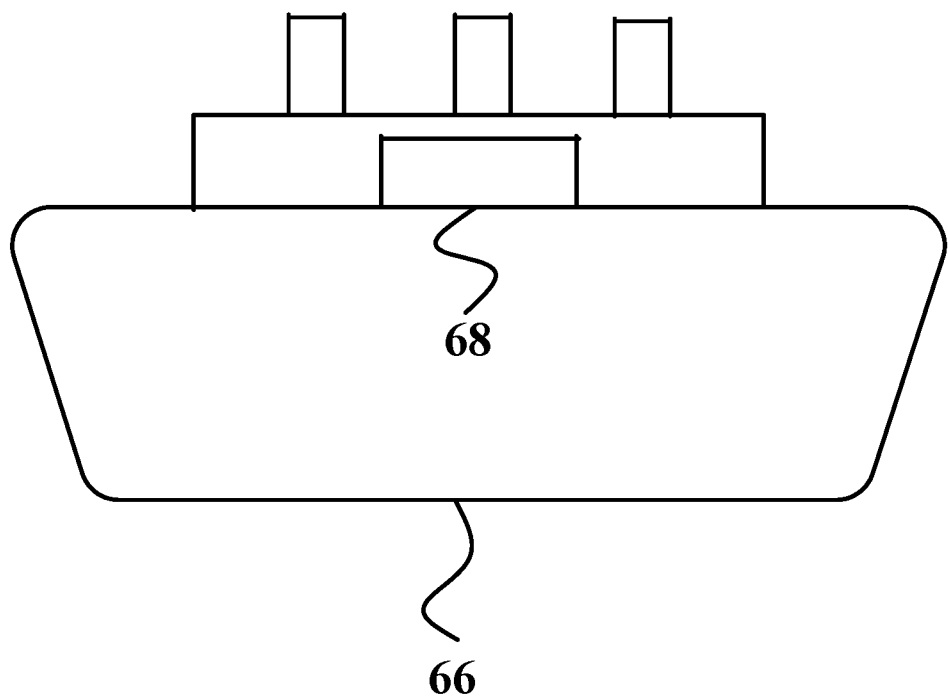
FIG. 19 is a side elevation view of a robotically controlled surface waste collection vessel in the preferred embodiment of the invention.

FIG. 19 is a side elevation view of a robotically controlled surface waste collection vessel 66 in the preferred embodiment of the invention, having robotic controller 68.

Figure 20:
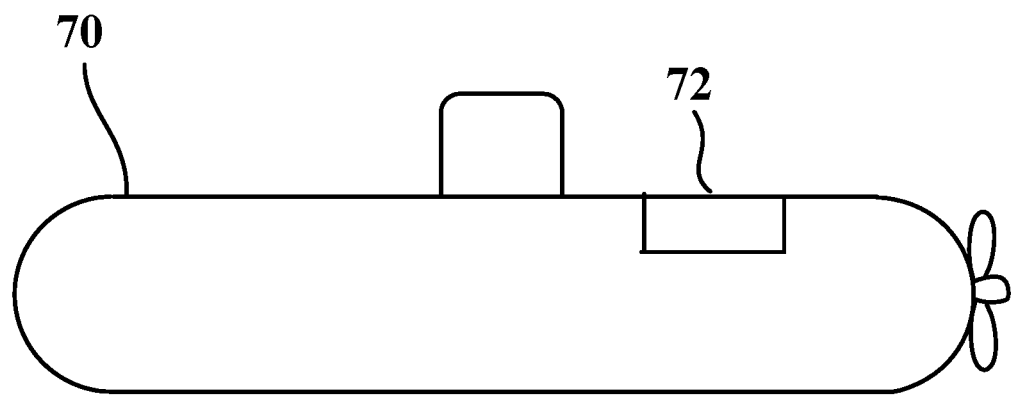
FIG. 20 is a side elevation view of a robotically controlled subsurface waste collection vessel in the preferred embodiment of the invention.

FIG. 20 is a side elevation view of a robotically controlled subsurface waste collection vessel 70 in the preferred embodiment of the invention, having robotic controller 72.

Robotically controlled collection systems may control ships, boats, barges, submarines, jet skis, trains, trucks, cars, etc.

Figure 21:
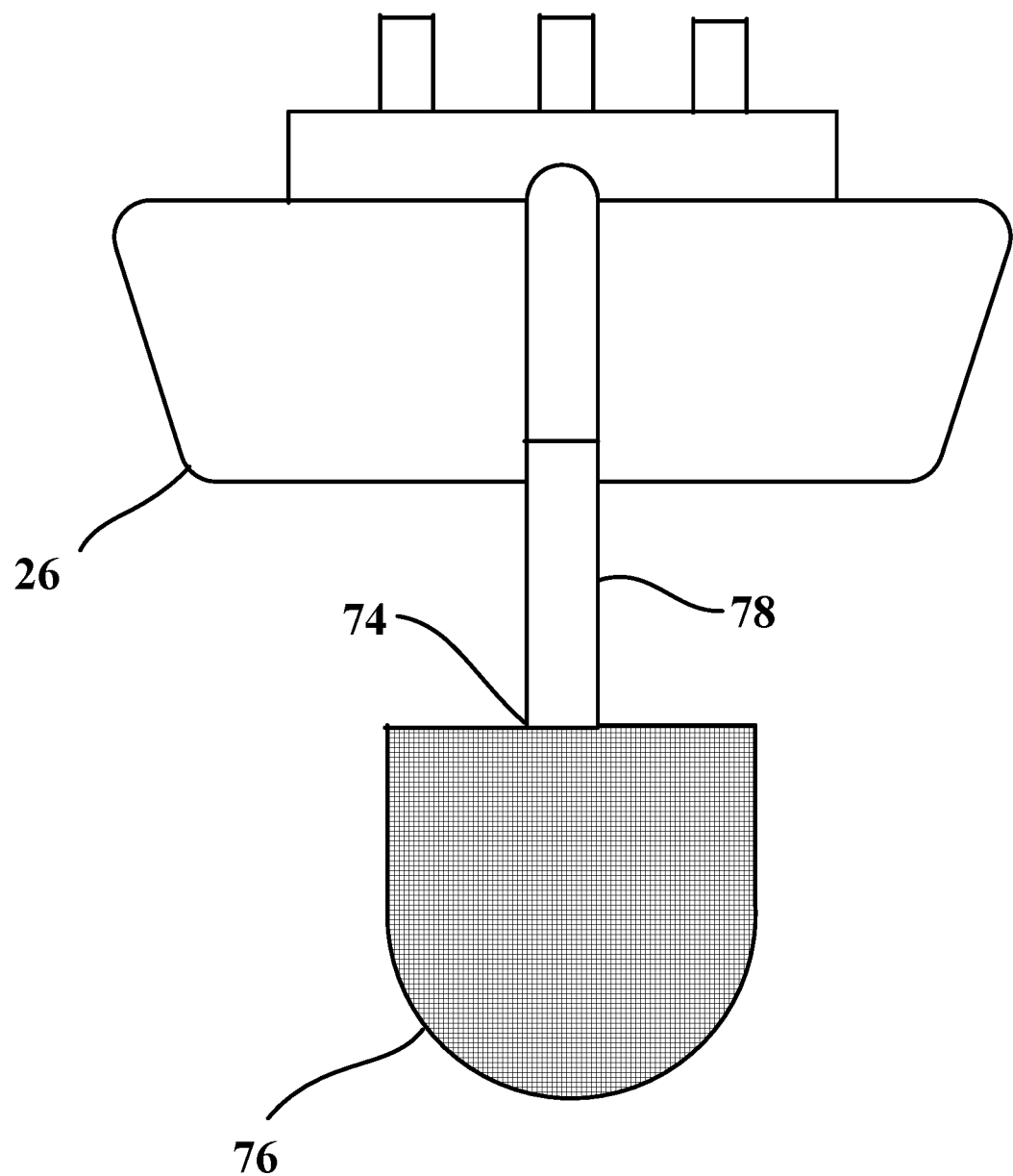
FIG. 21 is a side elevation view of a collecting mechanism with a screen that may be extended in the preferred embodiment of the invention.

FIG. 21 is a side elevation view of a collecting mechanism 74 in the preferred embodiment of the invention, attached to a vessel 26, with a screen 76, which may be extended at least six meters by telescoping arm 78 or other suitable means. The screen should have apertures with areas no greater than one square millimeters, preferably no greater than 160 square micrometers.

Figure 22:
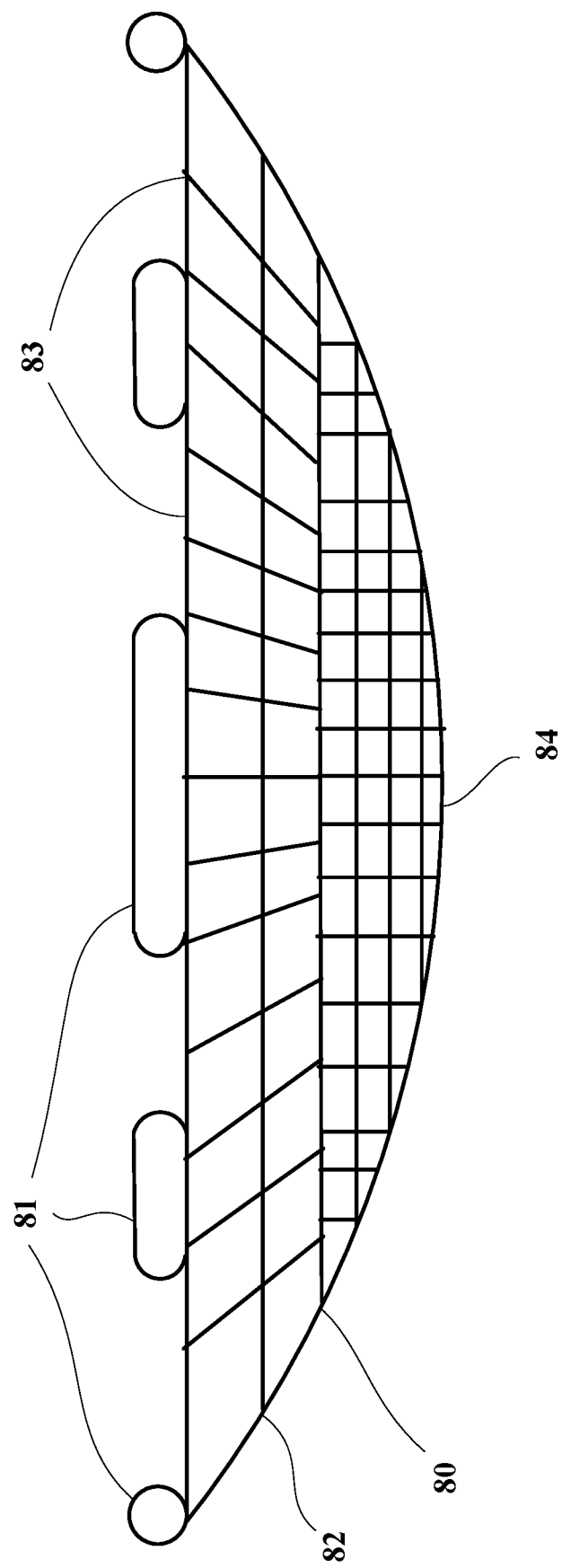
FIG. 22 is a front elevational view of the net of the preferred embodiment of the invention.

FIG. 22 is a front elevational view of a net 80 used in the preferred embodiment of the invention. The top 82 of the net has a larger mesh. The bottom 84 of the net has a smaller mesh. Floatation devices 81 keep edges of the nets at the surface of the body of water, with gaps 83 between the floatation devices through which fish can swim. One or more of the nets may be used to collect waste material from the surface of a body of water. The net is sunk to a depth of no more than five meters, and is raised slowly to allow fish to escape, while capturing floating plastic. The net may be closed as it is being raised from the water. It should be slowly closed and slowly raised. Small particles of plastic are most abundant in four meters from the ocean's surface (or three meters from the surface of inland bodies of water). Bodies of water include oceans, seas, lakes, rivers, streams, swamps, etc., or even artificial bodies of water such as in pools, tanks, vats, etc.

There may be a plurality of the nets, having varying mesh sizes, arranged vertically in order of mesh size, with the net having the largest mesh size at the top, and the net having the smallest net size at the bottom. The nets are closed and then raised. The largest mesh size may be five centimeters and the smallest net size may be twenty micrometers. Nets having larger mesh sizes are closed faster than nets having smaller mesh sizes. The edges of the nets have an angle of inclination from the top to the bottom of the nets of not more than twenty-five degrees before they are closed, whereby allowing fish and other marine life to exit from the nets through the larger mesh at the top, while retaining plastic or other material in the smaller mesh at the bottom. There may be a plurality of sets of vertically arranged nets spaced horizontally.

Each of the one or more nets may have larger net sizes at its top, and smaller net sizes at its bottom. As the nets are closed, the top of each net may close faster than its bottom, because of the difference in mesh sizes. The nets are then raised.

After the waste material is pulverized, but before it is reacted with carbon oxide gas, it may be mixed with one or more fluids to form a slurry or other mixture. The fluid may be water or one or more chemicals. The slurry may be mixed using mechanical mixing, screw turning, vibration, centrifuging, or sound waves. Carbonates may be added to the mixture to produce carbon dioxide. Formates may be added to the mixture to produce carbon monoxide. Catalysts, such as ceric sulfate and/or a gas reactor, may be added to the mixture. One or more metallic elements from the platinum group (which includes platinum, palladium, rhodium, ruthenium, iridium, and osmium) may be added to the mixture as catalysts. The catalysts may be coated or uncoated.

Figure 23:
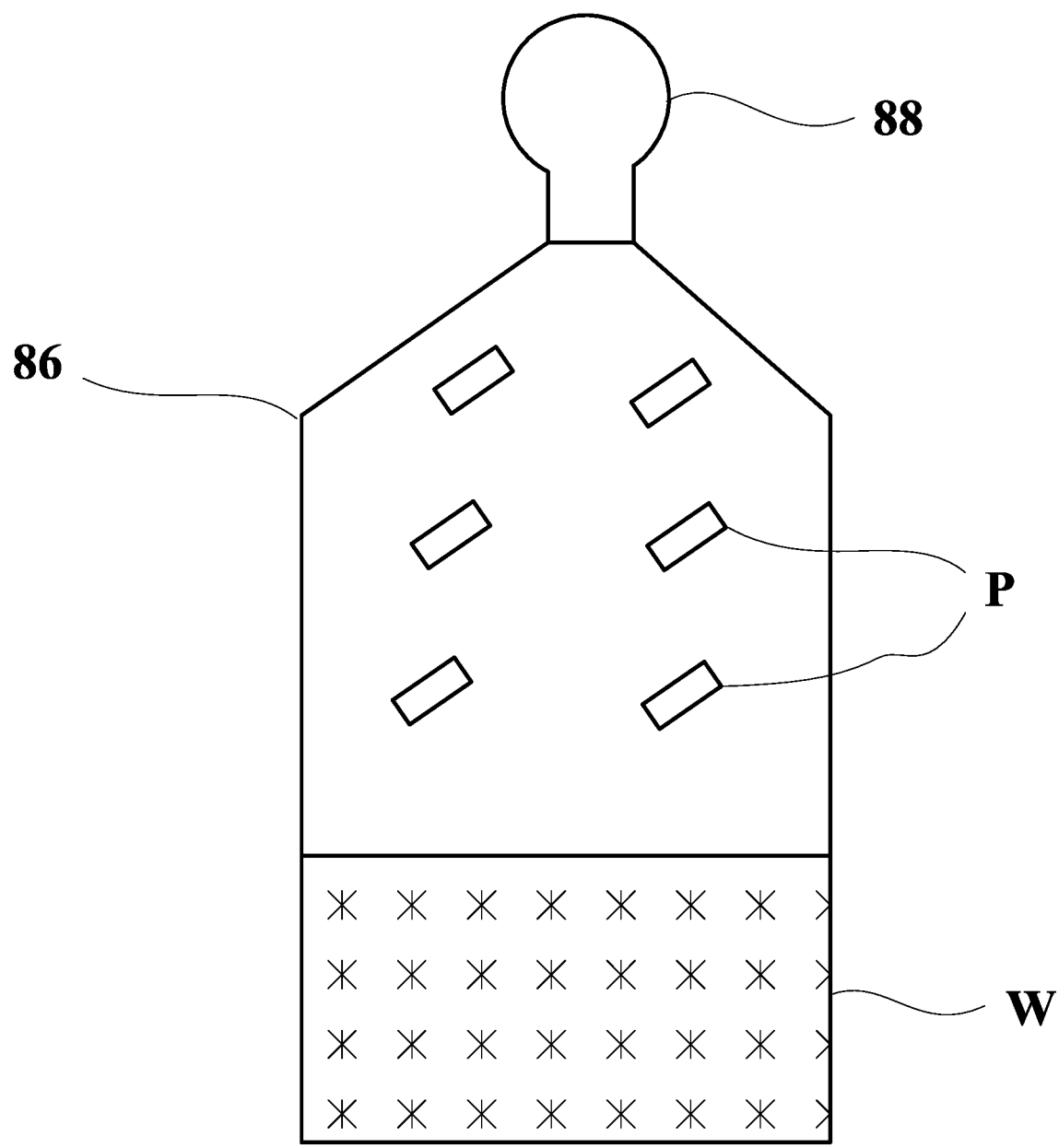
FIG. 23 is a front elevational view illustrating the vertical vacuum of the preferred embodiment of the invention.

FIG. 23 is a front elevational view of a chamber 86 in which a pump 88 separates plastic P from heavier waste material W by creating a vertical vacuum, i.e., the pump pulls air upward in a vertical direction, thus creating a partial vacuum at the top of the chamber, into which the lighter plastic is pulled, while the heavier material remains at the bottom. The plastic can then be removed from the top of the chamber.

Figure 24:
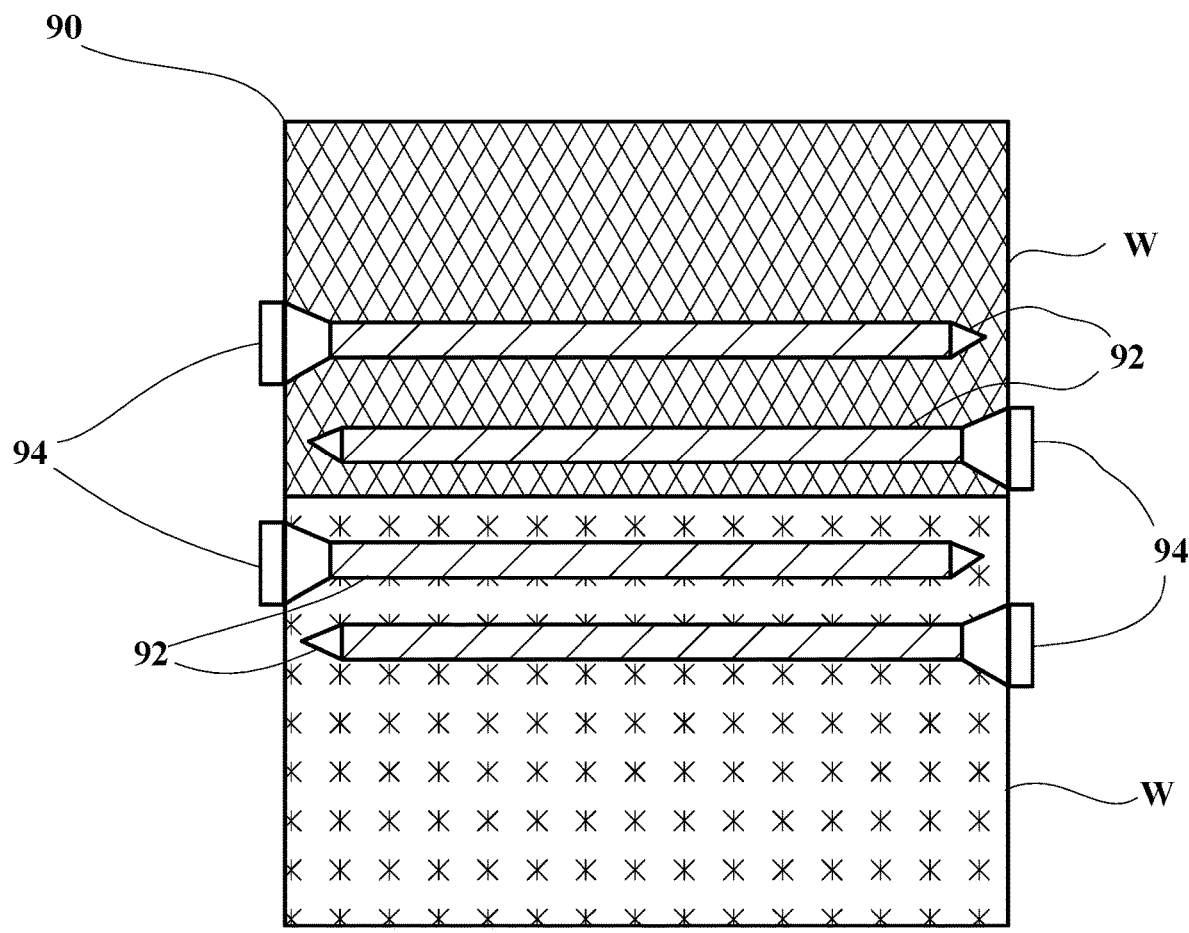
FIG. 24 is a front elevational view illustrating the interacting screws of the preferred embodiment of the invention.

FIG. 24 is a front elevational view of a chamber 90 in which interacting screws 92 pulverize waste material W. The screws are turned by motors 94. The screws may pulverize the waste material by turning in opposite directions. The screws may extend, retract and rotate.

Figure 25:
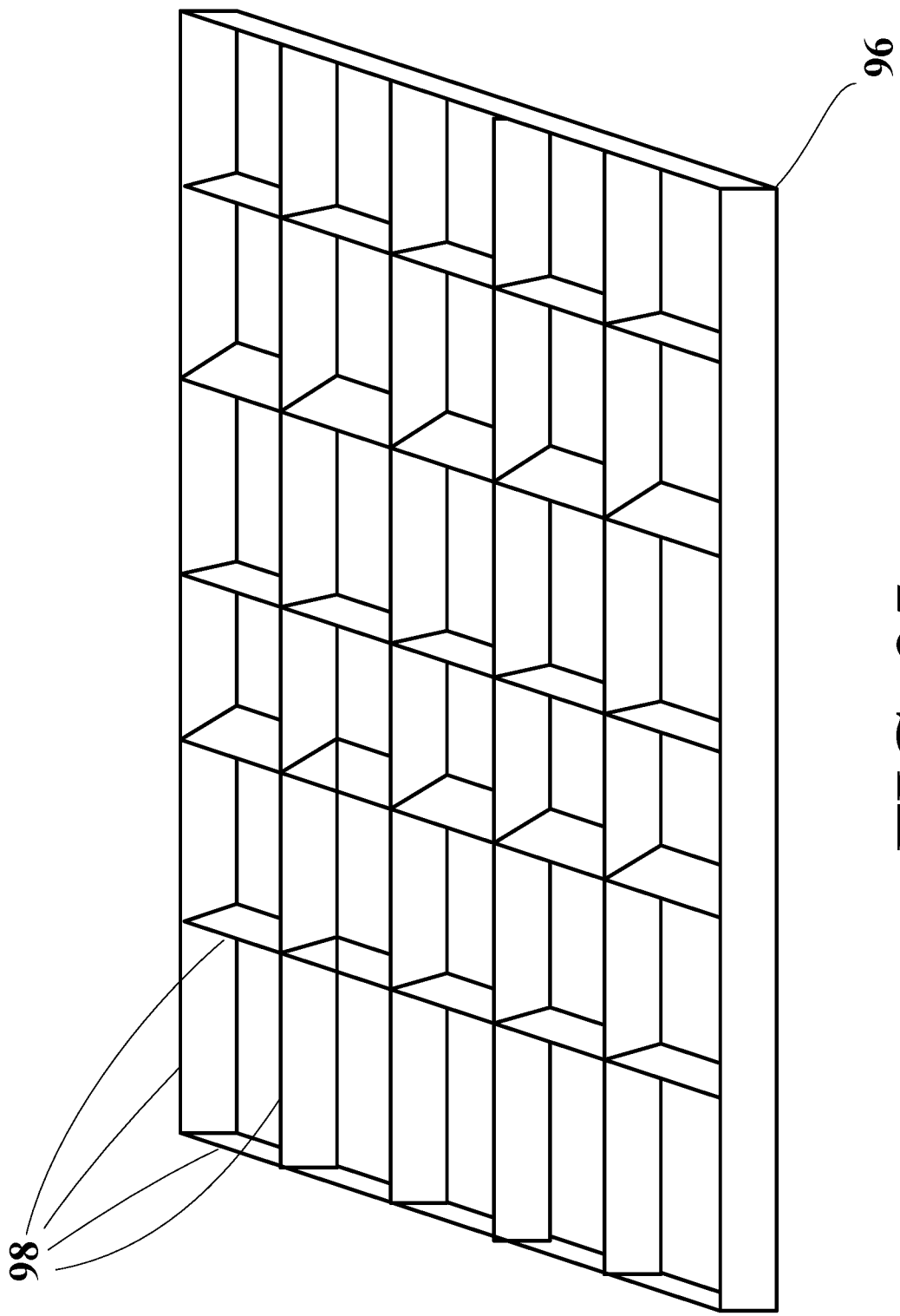
FIG. 25 is a perspective view of the knife-edged screen of the preferred embodiment of the invention.

FIG. 25 is a perspective view of a knife-edged screen 96. The screen is formed of multiple horizontal and vertical knife edges 98 at right angles. Waste material is pulverized either by forcing it through the screen, or by forcing the screen through the waste material.

Figure 26:
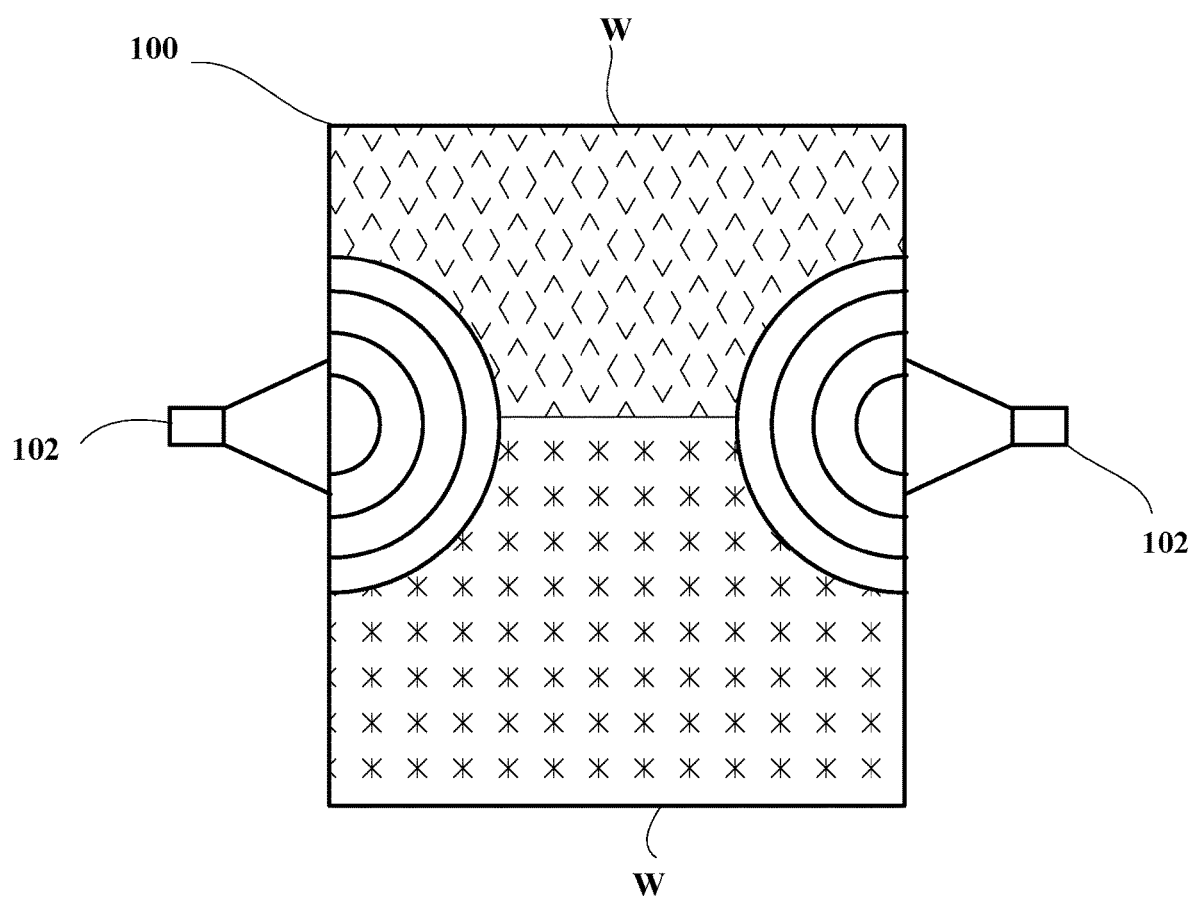
FIG. 26 is a front elevational view illustrating the sound pulverization of the preferred embodiment of the invention.

FIG. 26 is a front elevational view of a chamber 100 in which waste material W is pulverized by intense sound wave from loud speakers or other sound generators 102. The frequency of the sound waves may be within, above or below the normal range of human hearing.

Figure 27:
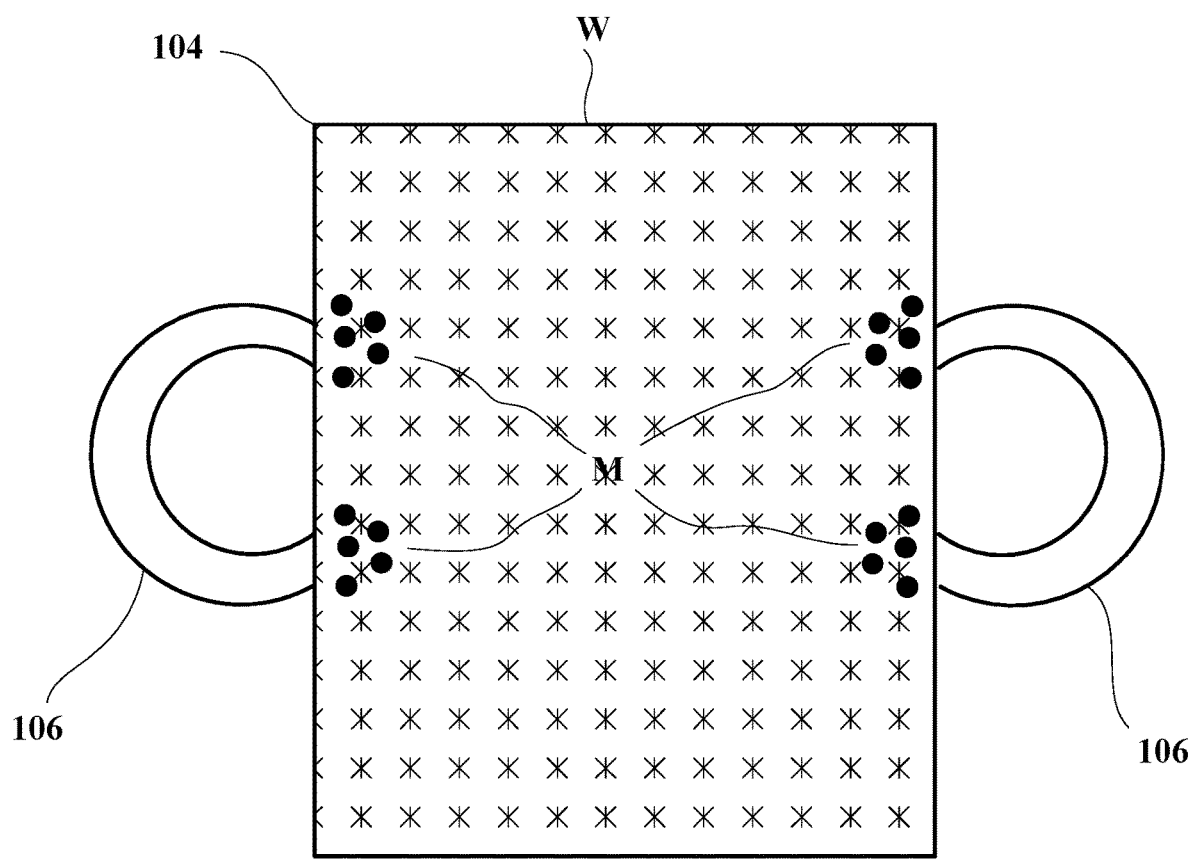
FIG. 27 is a front elevational view illustrating the magnetic separation of metal of the preferred embodiment of the invention.

FIG. 27 is a front elevational view of a chamber 104 in which metal M is removed from waste material W by magnets 106. The magnets may be permanent magnets, temporary magnets, or electromagnets. Waste material may be pulverized using metal balls or other objects moved by electromagnets that are turned on and off.

Figure 28:
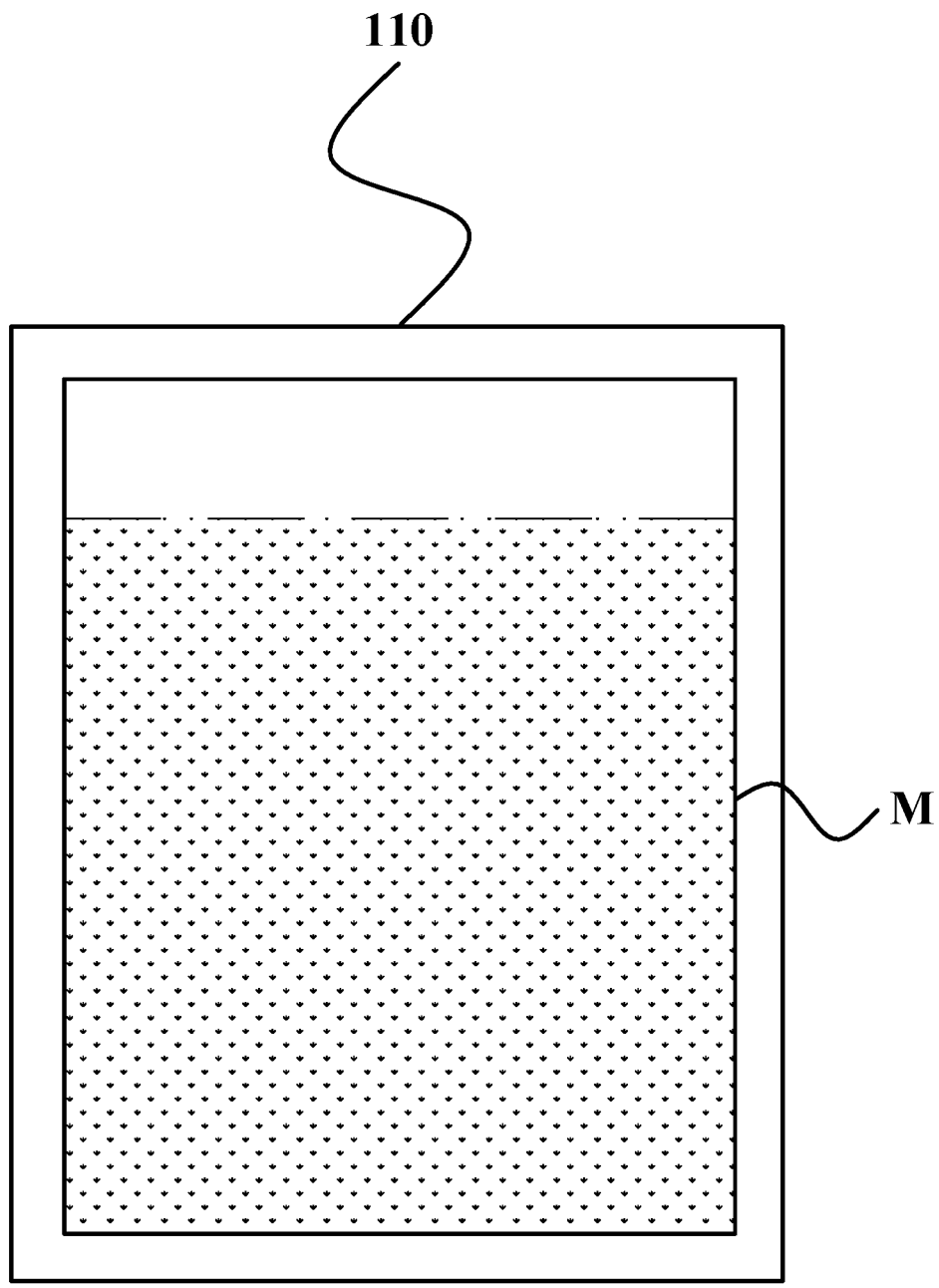
FIG. 28 is a front elevational view of the freezer in the preferred embodiment of the invention.

FIG. 28 is a front elevational view of the freezer 110 in the preferred embodiment of the invention, containing the waste material M being frozen.

Figure 29:
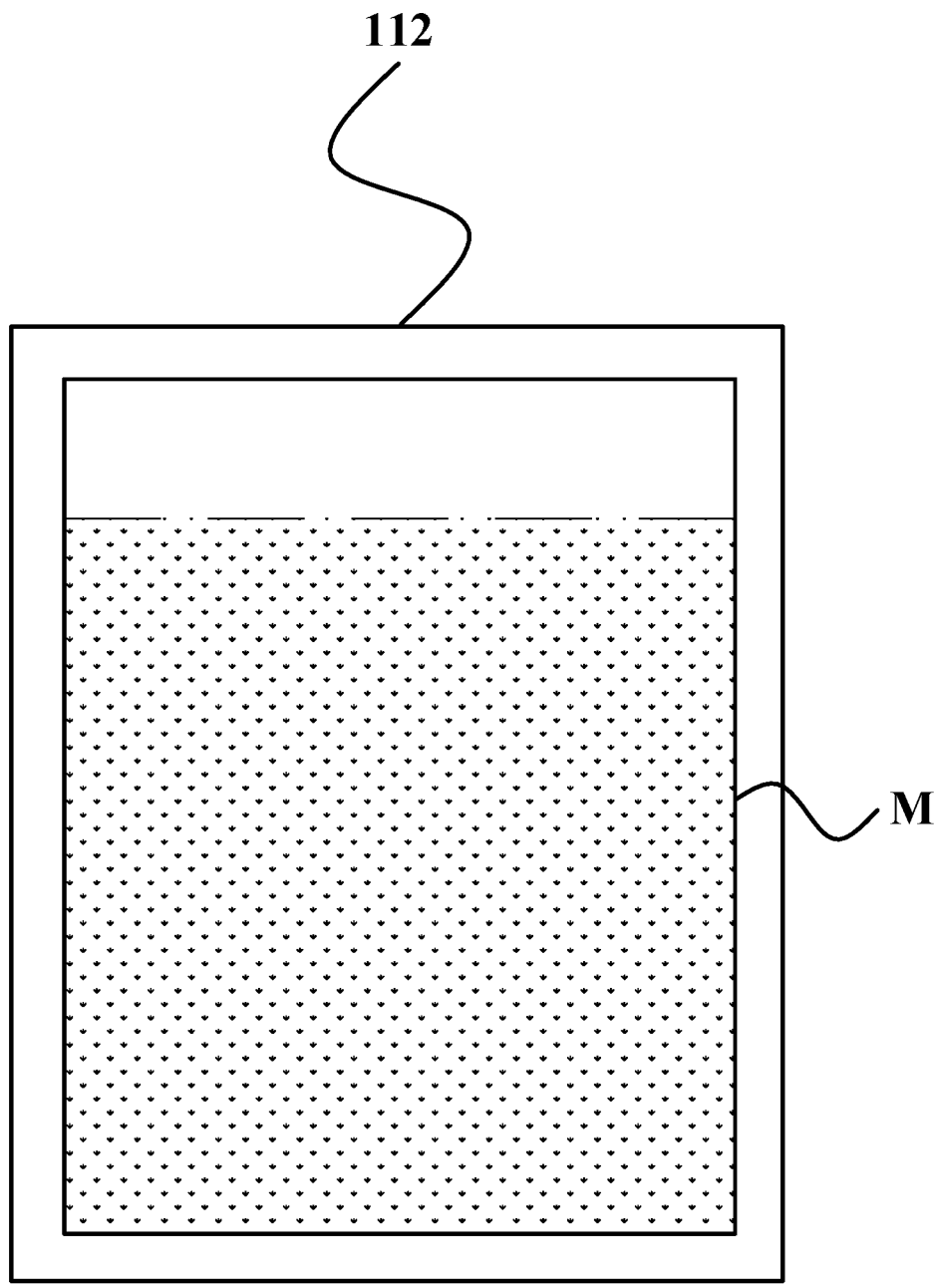
FIG. 29 is a front elevational view of the reactor in the preferred embodiment of the invention.

FIG. 29 is a front elevational view of the reactor 112 in the preferred embodiment of the invention, containing the waste material M being reacted on.

Figure 30:
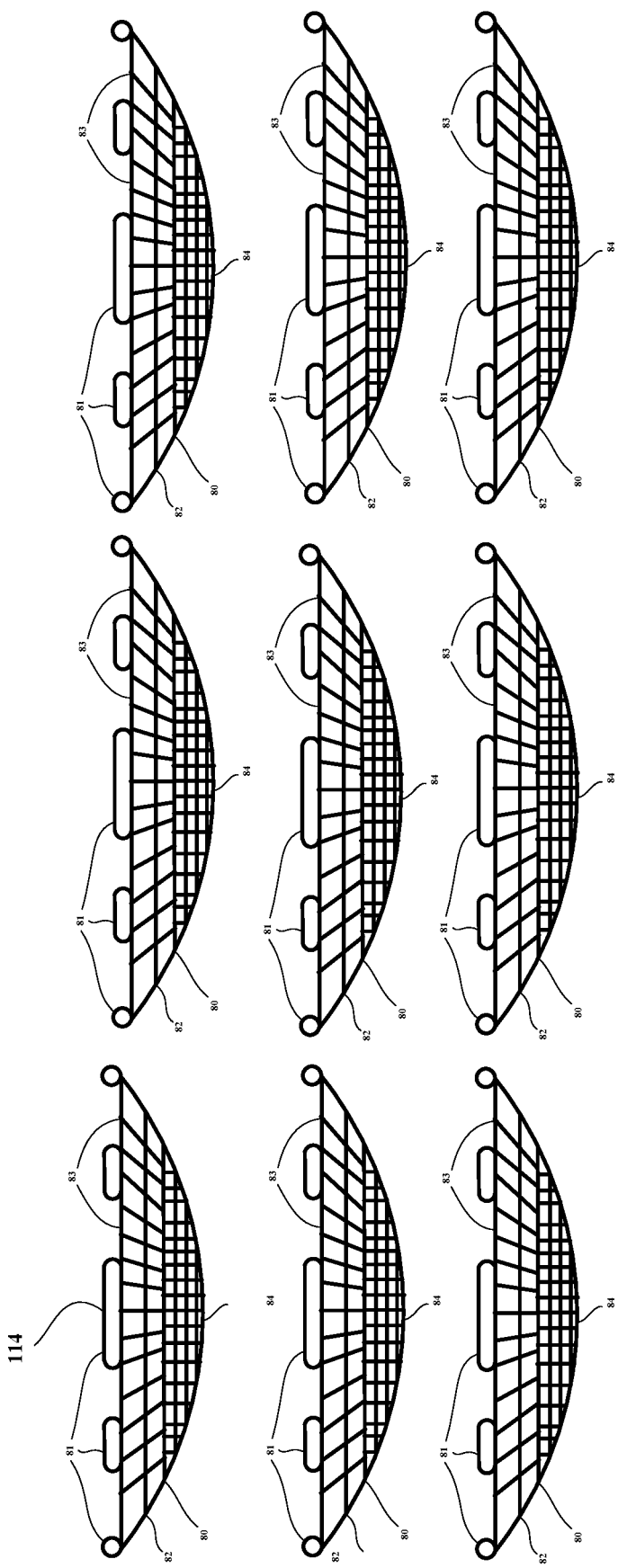
FIG. 30 is a front elevational view of the plurality of vertically arranged nets, spaced horizontally in the preferred embodiment of the invention.

FIG. 30 is a front elevational view of the plurality of vertically arranged nets, spaced horizontally 114 in the preferred embodiment of the invention.

It is to be understood that the present invention is not limited to the embodiment described above, but encompasses any and all embodiments within the scope of the following claims.

I claim:

1. An apparatus for waste management, comprising:
a boat equipped with nets to collect material from a surface and subsurface of a body of water,
a material shredder:
a material dryer;
a freezer that cools the material to a temperature at or below minus fifty degrees Fahrenheit in one or more chambers;
a pulverizer that pulverizes the material to maximize the ratio of the surface area to volume, and the ratio of surface area to mass, of particles of the material; and
a reactor, in which the material reacts with carbon oxide gas at a temperature at or above four hundred degrees Fahrenheit;
wherein the boat has one or more nets that are sunk to a depth of no more than five meters, and are capable of being closed and raised slowly to allow fish to escape, while capturing floating plastic; and
wherein a largest mesh size is five centimeters and a smallest mesh size is twenty micrometers.

2. An apparatus for waste management comprising:
a boat equipped with nets to collect material from a surface and subsurface of a body of water,
a material shredder;
a material dryer;
a freezer that cools the material to a temperature at or below minus fifty degrees Fahrenheit in one or more chambers;
a pulverizer that pulverizes the material to maximize the ratio of the surface area to volume, and the ratio of surface area to mass, of particles of the material; and
a reactor, in which the material reacts with carbon oxide gas at a temperature at or above four hundred degrees Fahrenheit;
wherein the pulverizer has knife-edged screens that pulverizes the waste material; and
wherein the pulverizer has multiple horizontal knife edges, and multiple vertical knife edges, at right angles.

3. An apparatus for waste management, comprising:
a boat having one or more nets with a largest mesh size of five centimeters and a smallest mesh size of twenty micrometers; and
a pulverizer having knife edge screens with multiple horizontal knife edges, and multiple vertical knife edges, at right angles.

* * * * *